US012709846B2

(12) United States Patent
Sugawara et al.

(10) Patent No.: US 12,709,846 B2
(45) Date of Patent: Aug. 18, 2026

(54) ROAD SURFACE MANAGEMENT DEVICE, ROAD SURFACE MANAGEMENT METHOD, AND RECORDING MEDIUM

(71) Applicant: NEC Corporation, Tokyo (JP)

(72) Inventors: Chisato Sugawara, Tokyo (JP); Toshimichi Yokote, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 18/572,978

(22) PCT Filed: Jun. 30, 2021

(86) PCT No.: PCT/JP2021/024661

§ 371 (c)(1),
(2) Date: Dec. 21, 2023

(87) PCT Pub. No.: WO2023/276019

PCT Pub. Date: Jan. 5, 2023

(65) Prior Publication Data

US 2024/0287748 A1 Aug. 29, 2024

(51) Int. Cl.
*G01N 21/88* (2006.01)
*E01C 23/01* (2006.01)

(52) U.S. Cl.
CPC ......... *E01C 23/01* (2013.01); *G01N 21/8851* (2013.01); *G01N 2021/8887* (2013.01)

(58) Field of Classification Search
CPC ................ E01C 23/01; G01N 21/8851; G01N 2021/8887
See application file for complete search history.

(56) References Cited

U.S. PATENT DOCUMENTS

2006/0274930 A1 12/2006 Laurent et al.
2018/0195973 A1* 7/2018 Yonekawa ............ G01B 11/30
2021/0303883 A1* 9/2021 Jumonji .................. G08G 1/00
2023/0091376 A1* 3/2023 Jumonji ................ G06N 5/022 706/46

FOREIGN PATENT DOCUMENTS

CN 107403197 B * 1/2020 ............ G06N 3/045
EP 3633605 A1 * 7/2020 .............. G06T 7/73
JP 2004156417 A * 6/2004
JP 2006-112127 A 4/2006
JP 2011-052373 A 3/2011
(Continued)

OTHER PUBLICATIONS

Translated version of JP 2004156417 (Year: 2004).*
(Continued)

*Primary Examiner* — Carol W Chan

(57) ABSTRACT

A road surface management device 1 includes a deterioration detection unit 2, a deterioration index calculation unit 3, and a display processing unit 4. The deterioration detection unit 2 detects a crack in a road surface on the basis of an
(Continued)

image of the road surface acquired from a vehicle. The deterioration index calculation unit 3 calculates, for the detected crack, a crack width and a crack rate on the basis of the image. The display processing unit 4 superimposes the calculated crack width and crack rate on the road surface on a map.

17 Claims, 17 Drawing Sheets

(56) References Cited

FOREIGN PATENT DOCUMENTS

| | | | | | |
|---|---|---|---|---|---|
| JP | 2013-079889 | A | | 5/2013 | |
| JP | 2015-007341 | A | | 1/2015 | |
| JP | 2017-101416 | A | | 6/2017 | |
| JP | 2018-021375 | A | | 2/2018 | |
| JP | 2018-087484 | A | | 6/2018 | |
| JP | 2019100136 | A | * | 6/2019 | |
| JP | 2019-163624 | A | | 9/2019 | |
| JP | 2020-013537 | A | | 1/2020 | |
| JP | 2020-035104 | A | | 3/2020 | |
| JP | 2020-046228 | A | | 3/2020 | |
| JP | 2020-056303 | A | | 4/2020 | |
| JP | 6678267 | B1 | * | 4/2020 | |
| JP | 6790210 | B1 | * | 11/2020 | |
| JP | 2021-060656 | A | | 4/2021 | |
| KR | 20080004737 | A | * | 1/2008 | ............. H04N 7/183 |
| WO | 2021/070842 | A1 | | 4/2021 | |

OTHER PUBLICATIONS

Translated version of JP 2019100136 (Year: 2019).*

Translated version of KR 20080004737 (Year: 2008).*

Gavilán, Miguel, David Balcones, Oscar Marcos, David F. Llorca, Miguel A. Sotelo, Ignacio Parra, Manuel Ocaña, Pedro Aliseda, Pedro Yarza, and Alejandro Amírola. "Adaptive road crack detection system by pavement classification." Sensors 11, No. 10 (2011): 9628-9657. (Year: 2011).*

Oliveira, Henrique, and Paulo Lobato Correia. "Automatic road crack detection and characterization." IEEE Transactions on Intelligent Transportation Systems 14, No. 1 (2012): 155-168. (Year: 2012).*

Zalama, Eduardo, Jaime Gómez-García-Bermejo, Roberto Medina, and José Llamas. "Road crack detection using visual features extracted by Gabor filters." Computer-Aided Civil and Infrastructure Engineering 29, No. 5 (2014): 342-358. (Year: 2014).*

International Search Report for PCT Application No. PCT/JP2021/024661, mailed on Sep. 14, 2021.

English translation of Written opinion for PCT Application No. PCT/JP2021/024661, mailed on Sep. 14, 2021.

JP Office Action for JP Application No. 2023-531218, mailed on Nov. 5, 2024 with English Translation.

* cited by examiner

Fig.3

SENSOR INFORMATION

| DATE AND TIME | POSITION | IMAGE | ACCELERATION |
|---|---|---|---|
| TD001 | L001 | P001 | A001 |
| TD002 | L002 | P002 | A002 |
| TD003 | L003 | P003 | A003 |
| TD004 | L004 | P004 | A004 |
| : | : | : | : |

Fig.4

GROUND SURFACE DISPLACEMENT INFORMATION

| POSITION | MEASUREMENT PERIOD | GROUND SURFACE DISPLACEMENT |
|---|---|---|
| L001 | TD001 | S001 |
| L002 | TD001 | S002 |
| L003 | TD001 | S003 |
| L004 | TD001 | S004 |
| : | : | : |

Fig.5

DETERIORATION INDEX

＊PH IS AN ABBREVIATION FOR POT HOLE

| DETECTION POSITION | DETECTION DATE AND TIME | DETERIORATION INDEX | | | | GROUND SURFACE DISPLACEMENT INFORMATION | DETECTION SOURCE IMAGE |
|---|---|---|---|---|---|---|---|
| | | CRACK RATE | CRACK WIDTH | PH SIZE | IRI | | |
| L001 | TD001 | 23 | 8 | 30 | 8.15 | S001 | P001, A001 |
| L002 | TD002 | 21.8 | 6 | — | 6.11 | S002 | P002, A002 |
| L003 | TD003 | — | — | — | 7.15 | S003 | P003, A003 |
| L004 | TD004 | 9.4 | 3 | — | 6.69 | S004 | P004, A004 |
| : | : | : | : | : | : | : | : |
| L001 | TD101 | 25 | 8 | 30 | 8.35 | S101 | P101, A101 |
| L002 | TD102 | 22.6 | 7 | 20 | 6.32 | S102 | P102, A102 |
| L003 | TD103 | 3.5 | 3 | — | 7.62 | S103 | P103, A103 |
| L004 | TD104 | 10.2 | 4 | — | 7.03 | S104 | P104, A104 |
| : | : | : | : | : | : | : | : |

Fig.6

TIME SERIES INFORMATION

| DETECTION POSITION | DETECTION DATE AND TIME | DETERIORATION INDEX | | | | GROUND SURFACE DISPLACEMENT INFORMATION | DETECTION SOURCE IMAGE |
|---|---|---|---|---|---|---|---|
| | | CRACK RATE | CRACK WIDTH | PH SIZE | IRI | | |
| L001 | TD001 | 23 | 8 | 30 | 8.15 | S001 | IMG_D001 |
| | : | : | : | : | : | : | : |
| | TD101 | 25 | 8 | 30 | 8.35 | S101 | IMG_D101 |
| | : | : | : | : | : | : | : |
| L002 | TD002 | 21.8 | 6 | — | 6.11 | S002 | IMG_D002 |
| | : | : | : | : | : | : | : |
| | TD102 | 22.6 | 7 | 20 | 6.32 | S102 | IMG_D102 |
| | : | : | : | : | : | : | : |
| L003 | TD003 | 10.2 | 4 | — | 7.15 | S003 | IMG_D003 |
| | : | : | : | : | : | : | : |
| | TD103 | 11.1 | 4 | — | 7.62 | S103 | IMG_D103 |
| | : | : | : | : | : | : | : |
| L004 | TD004 | 9.4 | 3 | — | 6.69 | S004 | IMG_D004 |
| | : | : | : | : | : | : | : |
| | TD104 | 10.2 | 4 | — | 7.03 | S104 | IMG_D104 |
| | : | : | : | : | : | : | : |
| : | : | : | : | : | : | : | : |

Fig.11

WEIGHT TABLE RELATED TO VALUE OF GROUND SURFACE DISPLACEMENT INFORMATION

| GROUND SURFACE DISPLACEMENT | L | M | H |
|---|---|---|---|
| WEIGHT | 1.0 | 1.2 | 1.5 |

S401
S402
A
B
DETECTION POSITION A
DETERIORATION INDEX
CRACK RATE
CRACK WIDTH
POT HOLE
GROUND SURFACE DISPLACEMENT
TIME SERIES INFORMATION
REPAIR TIME
CRACK WIDTH
TIME POINT
T1
T2
T3
T4
DETAILED INFORMATION
DETECTION TIME POINT T4
CRACK WIDTH 3.0
CRACK IMAGE

S403
S404
RUNWAY
C
DETECTION POSITION C
DETERIORATION INDEX
CRACK RATE
CRACK WIDTH
POT HOLE
GROUND SURFACE DISPLACEMENT
TIME SERIES INFORMATION
CRACK RATE
TIME POINT
T1
T2
T3
T4
DETAILED INFORMATION
DETECTION TIME POINT T1
CRACK RATE 23
DETECTION SOURCE IMAGE 500
506
RECORDING MEDIUM
507
DRIVE DEVICE
501
CPU
502
ROM
503
RAM
509
INPUT DEVICE
510
OUTPUT DEVICE
512
STORAGE DEVICE
504
PROGRAM
505
COMMUNICATION INTERFACE
508
INPUT/OUTPUT INTERFACE
511
COMMUNICATION NETWORK
PERIPHERAL DEVICE

ROAD SURFACE MANAGEMENT DEVICE, ROAD SURFACE MANAGEMENT METHOD, AND RECORDING MEDIUM

This application is a National Stage Entry of PCT/JP2021/024661 filed on Jun. 30, 2021, the contents of all of which are incorporated herein by reference, in their entirety.

TECHNICAL FIELD

The present disclosure relates to a road surface management device, a road surface management method, and a recording medium.

BACKGROUND ART

Regarding deterioration of a road surface such as a road or a runway, a staff member of a management company of the road surface rides on a patrol vehicle, checks the road surface, and acquires information (an image, acceleration, and the like) of the road surface to check whether there is deterioration that hinders use of the road surface.

For example, PTL 1 discloses a system that automatically detects a crack from image data captured by an in-vehicle camera by the image process, and calculates a "crack rate" that is one of indexes for evaluating deterioration of a pavement.

CITATION LIST

Patent Literature

PTL 1: JP 2018-21375 A

SUMMARY OF INVENTION

Technical Problem

However, PTL 1 is a system for managing a crack rate, but does not mention management including other deterioration indexes of a road surface. Therefore, in the system of PTL 1, it may be difficult to manage deterioration of a road surface including a crack rate and other deterioration indexes of the road surface.

An object of the present disclosure is to provide a road surface management device, a road surface management method, and a recording medium that reduce a burden of management related to deterioration of a road surface.

Solution to Problem

A road surface management device according to an aspect of the present disclosure includes a deterioration detection unit that detects, based on an image of a road surface acquired from a mobile body, a crack of the road surface, a deterioration index calculation unit that calculates a crack width and a crack rate of the detected crack based on the image, and a display processing unit that displays the calculated crack width and the calculated crack rate over the road surface on a map in a superimposed manner.

A road surface management method according to an aspect of the present disclosure includes detecting, based on an image of a road surface acquired from a mobile body, a crack of the road surface, calculating a crack width and a crack rate of the detected crack based on the image, and displaying the calculated crack width and the calculated crack rate over the road surface on a map in a superimposed manner.

A recording medium according to an aspect of the present disclosure records a program for causing a computer to execute the steps of detecting, based on an image of a road surface acquired from a mobile body, a crack of the road surface, calculating a crack width and a crack rate of the detected crack based on the image, and displaying the calculated crack width and the calculated crack rate over the road surface on a map in a superimposed manner.

Advantageous Effects of Invention

According to the present disclosure, a burden of management related to deterioration of a road surface can be reduced.

BRIEF DESCRIPTION OF DRAWINGS

FIG. 3 is an example illustrating sensor information according to the first example embodiment.

FIG. 4 is an example illustrating ground surface displacement information according to the first example embodiment.

FIG. 5 is a diagram illustrating a calculation example of a deterioration index in the first example embodiment.

FIG. 6 is a diagram illustrating an example of time series information according to the first example embodiment.

FIG. 11 is a diagram illustrating an example of a weighting table of ground surface displacement information according to the first example embodiment.

EXAMPLE EMBODIMENT

Figure 1:
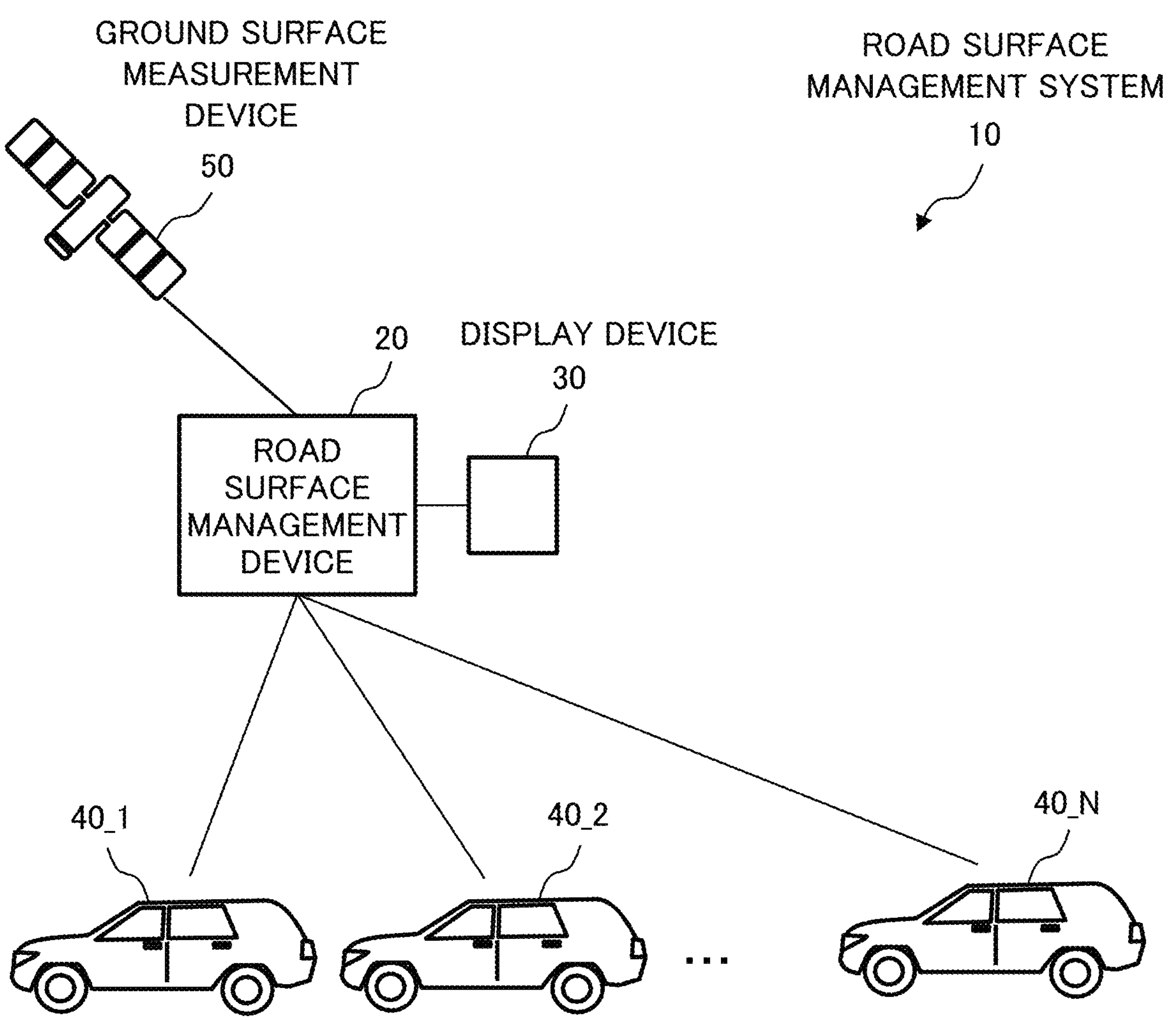
FIG. 1 is a schematic diagram illustrating an outline of a road surface management system 10 according to the first example embodiment.

An example embodiment will be described in detail with reference to the drawings. In the drawings and the example embodiments described in the specification, the same reference numerals are given to the same components, and the description thereof will be omitted as appropriate.

First Example Embodiment

The first example embodiment will be described.

First, a configuration of a road surface management system according to the first example embodiment will be described. FIG. 1 is a schematic diagram illustrating an outline of a road surface management system 10 according to the first example embodiment. Referring to FIG. 1, the road surface management system 10 includes a road surface management device 20 and a display device 30. The road surface management system 10 appropriately uses data acquired by a plurality of vehicles 40_1, 40_2, . . . , 40_N (N is a natural number) (hereinafter, collectively referred to as a vehicle 40) and a ground surface measurement device 50.

In the road surface management system 10, an imaging device that acquires an image of a road surface, an acceleration sensor that acquires acceleration of the vehicle 40, and a position information acquisition device that acquires a position of the vehicle 40 are mounted on the vehicles 40_1, 40_2, . . . , 40_N belonging to a road surface management company. Examples of the position information acquisition device include a global positioning system (GPS) and a global navigation satellite system (GNSS) receiver.

Each vehicle 40 is communicably connected to the road surface management device 20 through, for example, a communication network. Road surface management device 20 receives ground surface displacement information, which is information indicating displacement of the ground surface, from the ground surface measurement device 50.

The ground surface measurement device 50 measures and outputs the height of the ground surface. It analyzes and outputs the displacement of the ground surface based on the measured height of the ground surface. As one form of the ground surface measurement device, there is a device in which a synthetic aperture radar SAR is mounted on a flying object such as an artificial satellite, an aircraft, or an unmanned aerial vehicle (drone), and the ground surface is measured by the SAR. However, the device mounted on the flying object is not limited to the SAR, and other laser measuring devices or devices that measure the ground surface using an optical sensor may be used.

The road surface management device 20 and the display device 30 are disposed, for example, in a building of the road surface management company described above. The road surface management device 20 may be disposed in a building other than that of the road surface management company described above. In this case, the road surface management device 20 may be achieved by a cloud computing system.

The display device 30 is, for example, a display. The display device 30 displays a map and an image by the road surface management device 20.

In the present example embodiment, a case where an imaging device, an acceleration sensor, and a GPS device are mounted on the vehicle 40 will be described. The imaging device may be, for example, a drive recorder. The imaging device, the acceleration sensor, and the GPS device may be mounted on another mobile body such as a bicycle or a drone, or may be carried by a person.

Figure 2:
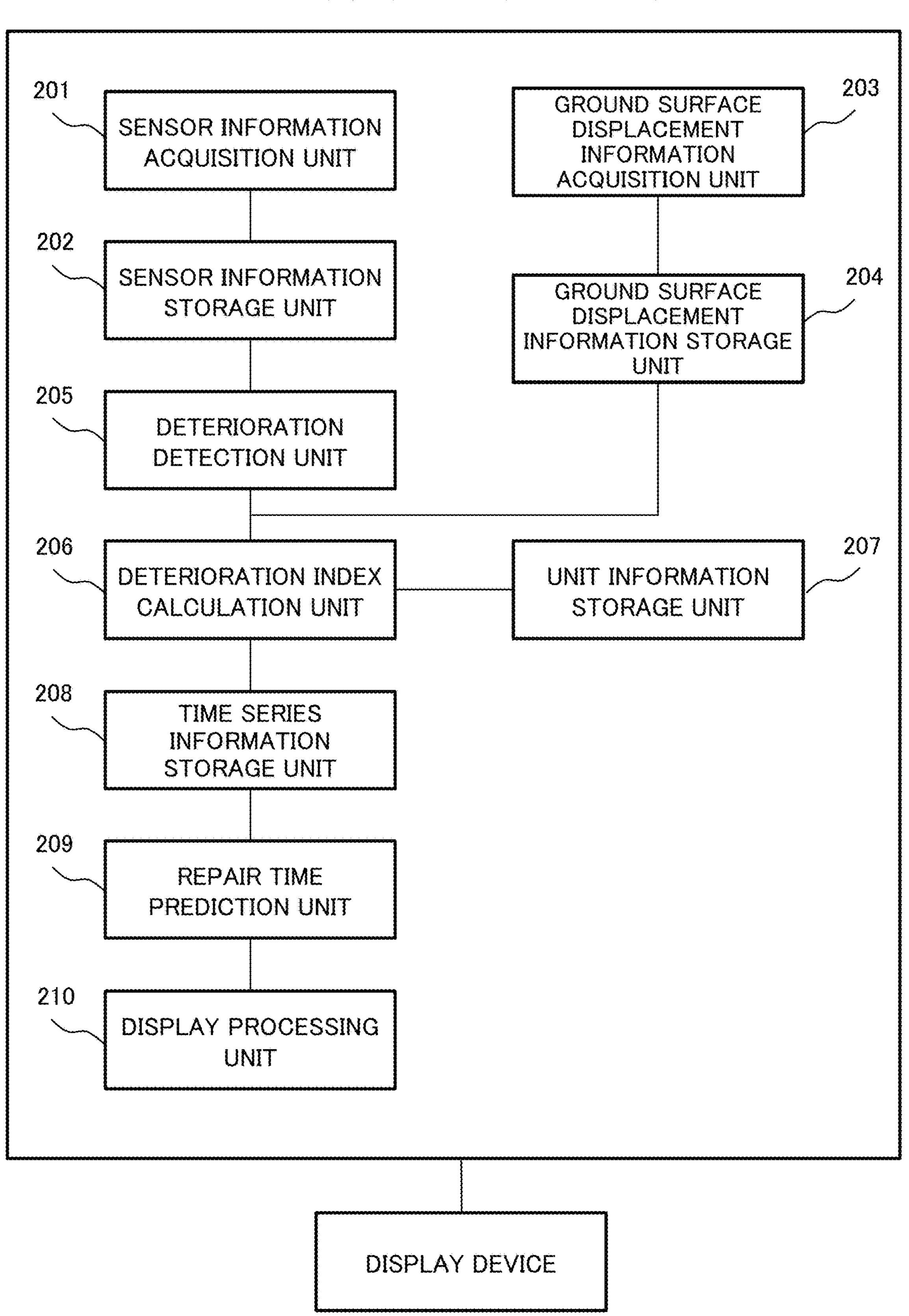
FIG. 2 is a block diagram illustrating an example of a configuration of a road surface management device 20 according to the first example embodiment.

Next, a configuration of the road surface management device will be described with reference to FIG. 2. FIG. 2 is a block diagram illustrating an example of a configuration of the road surface management device 20 according to the first example embodiment.

(Configuration of Road Surface Management Device 20)

As illustrated in FIG. 2, the road surface management device 20 includes a sensor information acquisition unit 201, a sensor information storage unit 202, a ground surface displacement information acquisition unit 203, a ground surface displacement information storage unit 204, a deterioration detection unit 205, a deterioration index calculation unit 206, a unit information storage unit 207, a repair time prediction unit 208, a time series information storage unit 209, and a display processing unit 210.

The sensor information acquisition unit 201 acquires, from each vehicle 40, sensor information including the captured image of the road surface, the measured acceleration, and the position and date and time at the time of capturing the image and measuring the acceleration. The sensor information will be described. FIG. 3 is an example illustrating sensor information according to the first example embodiment. In the example of FIG. 3, the sensor information includes items of a "date and time", a "position", an "image", and an "acceleration". For example, in the sensor information in FIG. 3, "date and time" and "position" represent the date, time, and position when the "image" and the "acceleration" are acquired. The position is represented by, for example, latitude and longitude. The sensor information acquisition unit 201 outputs the acquired sensor information to the sensor information storage unit 202.

The sensor information storage unit 202 stores the sensor information for each vehicle 40 acquired by the sensor information acquisition unit 201.

The ground surface displacement information acquisition unit 203 acquires ground surface displacement information indicating displacement of the ground surface in a predetermined region acquired by the ground surface measurement device 50. The ground surface displacement information acquisition unit 203 outputs the acquired ground surface displacement information to the ground surface displacement information storage unit 204. The ground surface displacement information will be described. FIG. 4 is an example illustrating ground surface displacement information according to the first example embodiment. In the example of the ground surface displacement information illustrated in FIG. 4, there are items of a "position", a "measurement period", and a "ground surface displacement". The "position" indicates a position where the "ground surface displacement" is acquired in the "measurement period". This position is represented by, for example, latitude and longitude. The "measurement period" is represented by, for example, a measurement start date and time and a measurement end date and time. Examples of the "measurement period" include a period of three months, half a year, one year, or more. the "ground surface displacement" represents, for example, displacement of the ground surface at a position and a measurement period designated by the "position" and the "measurement period". The displacement indicates a difference between a position of the ground surface at the measurement start date and time and a position of the ground surface at the measurement end date and time in the measurement period.

The ground surface displacement information storage unit 204 stores the ground surface displacement information acquired by the ground surface displacement information acquisition unit 203.

The deterioration detection unit 205 detects a crack on the road surface based on the image of the road surface acquired from each vehicle 40. The deterioration detection unit 205 detects another road surface deterioration other than a crack based on at least any one of an image and acceleration acquired from each vehicle 40. The another road surface deterioration other than the crack is, for example, rutting, a pot hole, an International Roughness Index (IRI), a Maintenance Control Index (MCI), flatness σ, and a Boeing Bump Index (BBI). A method of deterioration detection will be described later.

The deterioration index calculation unit 206 calculates, of the detected crack, a crack width and a crack rate based on the image. The deterioration index calculation unit 206 may calculate time series information about a crack width and time series information about a crack rate. The deterioration index calculation unit 206 may calculate a rate of change (also referred to as a rate of change) in an index value of at least one of the crack width and the crack rate representing a rate of increase/decrease of the index value in a predetermined period based on the time series information. The predetermined period is an any period, and is, for example, three days, one week, or one month, but is not limited thereto.

At this time, the deterioration index calculation unit 206 may perform a statistical process on outliers of the crack width and the crack rate to calculate the rate of change in the crack width and the rate of change in the crack rate. The deterioration index calculation unit 206 may calculate time series information about a rate of change in a crack width in a predetermined period and a rate of change in a crack rate in a predetermined period.

The deterioration index calculation unit 206 predicts deterioration of a crack of a road surface based on time series information about a crack width, time series information about a crack rate, and time series information about ground surface displacement information that is displacement information about the ground surface. The deterioration of the crack indicates that the state of the crack is deteriorated, for example, the crack width or the range of the crack is expanded, or the type of the crack changes from a linear crack to a hole (pot hole or the like) through a tortoise-like shape. The deterioration index calculation unit 206 may predict deterioration of the crack of the road surface based on not only the time series information about the crack width, the time series information about the crack rate, and the time series information about the ground surface displacement information that is displacement information about the ground surface but also another time series information. For example, in addition to the above information, the deterioration index calculation unit 206 may further predict deterioration of the crack of the road surface based on the time series information about the rate of change in the crack width or the rate of change in the crack rate. The deterioration index calculation unit 206 may predict deterioration of a crack of a road surface by changing a combination of the time series information described above. The deterioration index calculation unit 206 outputs the calculated time series information about the crack to the time series information storage unit 209.

Further, the deterioration index calculation unit 206 may calculate an index value indicating a state of another road surface deterioration other than the crack. In this case, as in the crack width and the crack rate, the deterioration index calculation unit 206 may calculate index value of another road surface deterioration. The deterioration index calculation unit 206 may predict another road surface deterioration in the same manner as the prediction of the deterioration of the crack. The deterioration index calculation unit 206 outputs the calculated time series information about the another road surface deterioration to the time series information storage unit 209. Hereinafter, the time series information about various deterioration indexes calculated by the deterioration index calculation unit 206 is also simply referred to as time series information.

FIG. 5 is a diagram illustrating a calculation example of a deterioration index according to the first example embodiment. The calculation example of the deterioration index illustrated in FIG. 5 indicates a deterioration index calculated by the deterioration index calculation unit 206 based on the sensor information illustrated in FIG. 3 and the ground surface displacement information illustrated in FIG. 4. In the deterioration index of FIG. 5, values of the deterioration index are calculated by the deterioration index calculation unit 206 for the "crack rate", the "crack width", the "size of pot hole", and the "IRI" detected by the deterioration detection unit 205. The deterioration index is not limited thereto, and may be another deterioration index, for example, rutting as described above or a maintenance control index (MCI). The deterioration index calculated by the deterioration index calculation unit 206 may be all or some of the indexes illustrated in FIG. 5. In the deterioration index illustrated in FIG. 5, for example, sensor information used to detect and calculate the deterioration index is included as "detection source information".

The unit information storage unit 207 stores in advance, for example, unit information including a unit identification (ID) of each unit obtained by dividing a road surface of a road by a predetermined section and position information about the unit. The unit may be set to be divided by a predetermined section for each lane for each up and down of the road. The unit may be set by dividing the road surface by a predetermined size. The size and shape of the unit may be appropriately determined according to the convenience of road surface management and other circumstances. The size and shape of the unit may be determined by a previously publicly determined method, for example, based on a region mesh determined by the Ministry of Internal Affairs and Communications.

The repair time prediction unit 208 predicts a repair time of a crack on the road surface based on the deterioration of the crack on the road surface predicted by the deterioration index calculation unit 206. A prediction method will be described later.

The time series information storage unit 209 stores the time series information about the deterioration index calculated by the deterioration index calculation unit 206. The time series information will be described. FIG. 6 is a diagram illustrating an example of time series information in the first example embodiment. The example of the time series information in FIG. 6 is an example of the time series information based on the calculation example of the deterioration index in FIG. 5. That is, in the example of the time series information illustrated in FIG. 6, the indexes calculated by the deterioration index calculation unit 206 are stored in time series for each detection position of the road surface.

The display processing unit 210 displays the crack width and the crack rate calculated by the deterioration index calculation unit 206, for example, over the road surface on the map displayed on the display device 30 in a superimposed manner. The display processing unit 210 may display an index value of another road surface deterioration calculated by the deterioration index calculation unit 206 in a similar manner over the road surface on the map displayed on the display device 30 in a superimposed manner.

Figure 7:
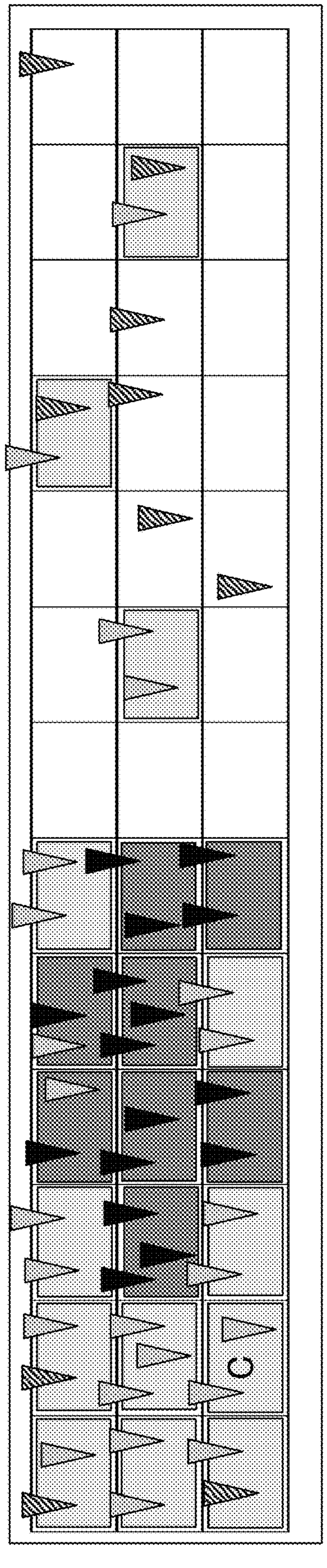
FIG. 7 is a diagram illustrating an example in which a display processing unit 210 displays a crack width and a crack rate on the display device 30 by superimposing the crack width and the crack rate on a road surface on a map.

FIG. 7 is a diagram illustrating an example in which the display processing unit 210 displays on the display device 30 the crack width and the crack rate over the road surface on the map in a superimposed manner. In the example of FIG. 7, the degree (classification) of a crack rate is represented by separately painting a plurality of units obtained by dividing the road surface by shading. The degree (classification) of a crack width is represented by separately painting predetermined symbols on the map by shading. For example, in the example of FIG. 7, the degree of each of the crack rate and the crack width is distinguished by three levels of shading (high, medium, and low). In the example of FIG. 7, the predetermined symbol is an inverted triangle symbol. In the example illustrated in FIG. 7, the degree of each of the crack rate and the crack width is distinguished in three levels, but the present disclosure is not limited thereto. The degree of each of the crack rate and the crack width may be distinguished in two levels, may be distinguished in more than three levels, or may be a continuous value. The degree of each of the crack rate and the crack width may be represented in a display mode other than shading. The degree of the index of another road surface deterioration may be represented as in the degree of each of the crack rate and the crack width.

In the example of FIG. 7, the shape of the unit is rectangular, and the crack width on the unit is represented in shading of an inverted triangle, which is a predetermined symbol, but the present disclosure is not limited thereto. The predetermined symbol indicating the shape of the unit or the crack width on the unit may be represented in an any shape. For example, the predetermined symbol representing the crack width may be represented by shading of a figure having another shape such as a circle or a rectangle instead of an inverted triangle. The degrees of deterioration index of another road surface may be similarly represented.

The display processing unit 210 displays at least one of the time series information about the crack width and the time series information about the crack rate, together with the map. The display processing unit 210 may also display time series information about an index value of another road surface deterioration, together with the map. For example, the display processing unit 210 may display the time series information about the crack width as a graph of the crack width and the time point.

Next, an operation of the first example embodiment will be described.

(Flow of Deterioration Index Calculation Process)

The flow of operation of the deterioration index calculation process in the road surface management device 20 of the road surface management system 10 will be described with reference to FIG. 8.

Figure 8:
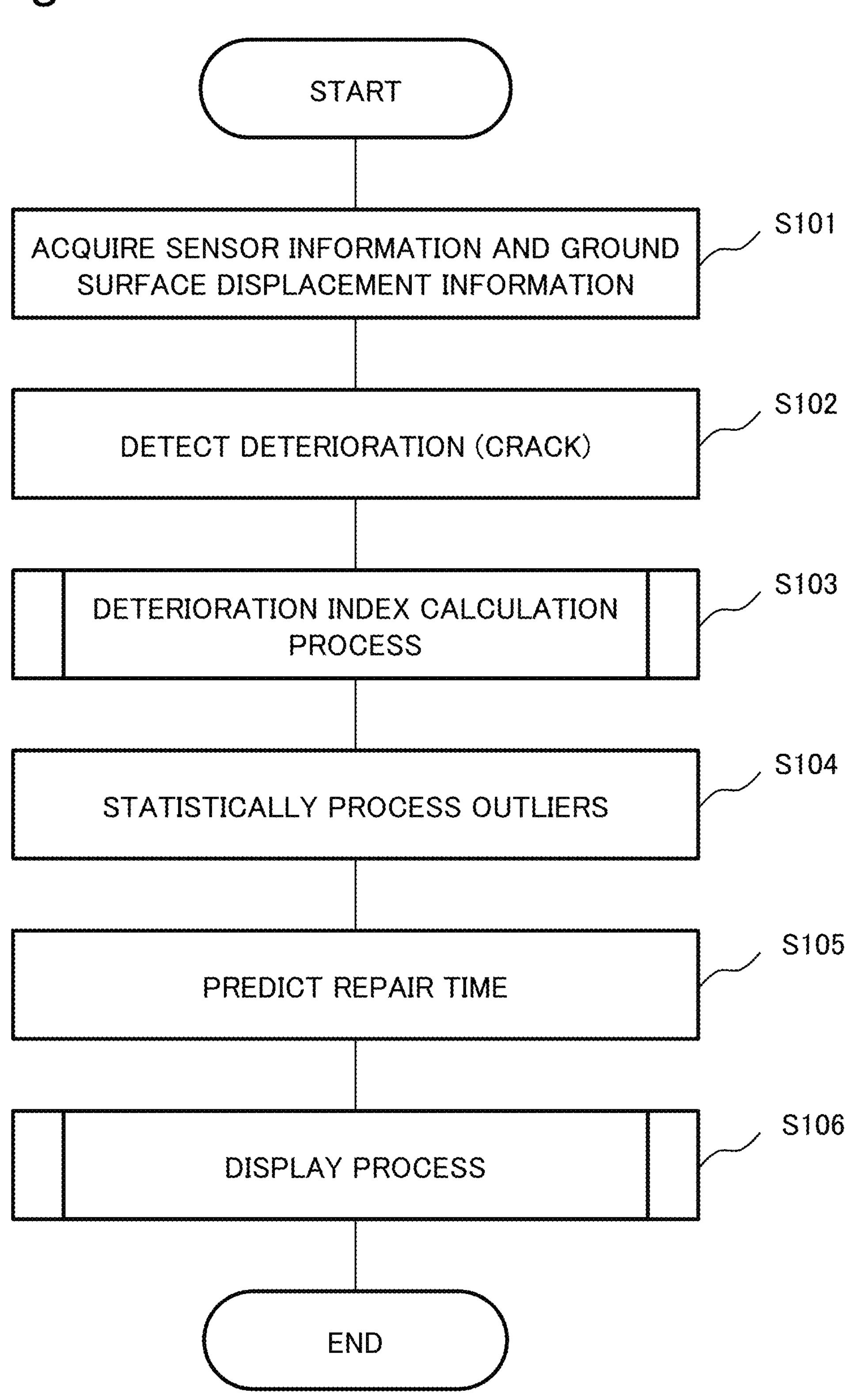
FIG. 8 is a flowchart illustrating a deterioration index process of the road surface management device 20 according to the first example embodiment.

FIG. 8 is a flowchart illustrating a deterioration index process of the road surface management device 20 according to the first example embodiment. The road surface management device 20 may automatically execute the deterioration index process at an any timing after the sensor information is transmitted from the vehicle 40, or may execute the deterioration index process in response to an instruction by a staff member of the road surface management company.

In the following description of the deterioration index process, it is assumed that the road surface managed by the road surface management device 20 is a road surface of a road. The road surface of the target road is a road surface of one lane on each side, and the unit is a unit obtained by dividing each of the up and down of the road by a predetermined section. It is assumed that indexes of deterioration of a road surface are a crack rate and a crack width.

The sensor information acquisition unit 201 of the road surface management device 20 acquires the sensor information transmitted by each vehicle 40, and the ground surface displacement information acquisition unit 203 acquires the ground surface displacement information measured by the ground surface measurement device 50 (step S101). The sensor information acquisition unit 201 outputs the acquired sensor information to the sensor information storage unit 202. The sensor information storage unit 202 stores the acquired sensor information. The sensor information is, for example, the sensor information as illustrated in FIG. 3 described above. The ground surface displacement information acquisition unit 203 outputs the acquired ground surface displacement information to the ground surface displacement information storage unit 204. The ground surface displacement information storage unit 204 stores the acquired ground surface displacement information. The ground surface displacement information is, for example, ground surface displacement information as illustrated in FIG. 4 described above.

The deterioration detection unit 205 detects a crack, which is deterioration of a road surface, based on the sensor information stored in the sensor information storage unit 202 (step S102). The deterioration detection unit 205 detects a crack on the road surface based on an image included in the sensor information. For example, the deterioration detection unit 205 detects a crack by performing image analysis on the road surface appearing in the image. In the image analysis, for example, an analysis model trained by various machine training methods for the type of deterioration of the road surface is used. However, the method of image analysis by the deterioration detection unit 205 is not limited thereto, and other methods may be used as long as a crack can be detected. For example, when the index of the road surface deterioration is an IRI, the deterioration detection unit 205 may detect the unevenness of the road surface using the acceleration included in the sensor information. In a case where the index of the road surface deterioration is rutting, for example, the deterioration detection unit 205 may detect rutting based on the image and the acceleration.

The deterioration index calculation unit 206 performs a deterioration index calculation process of calculating an index value of the detected road surface deterioration (step S103). An example of the deterioration index calculation process in step S103 will be described later.

The deterioration index calculation unit 206 statistically processes outliers from the time series information stored in the time series information storage unit 209 (step S104). The deterioration index calculation unit 206 may calculate the deterioration index value based on an inappropriate value of the image or the acceleration, which may cause an error in the calculated index value. The index value in which such an error has occurred is stored as time series information for the calculated index value, and is handled as an outlier by analyzing the time series information.

Figure 9:
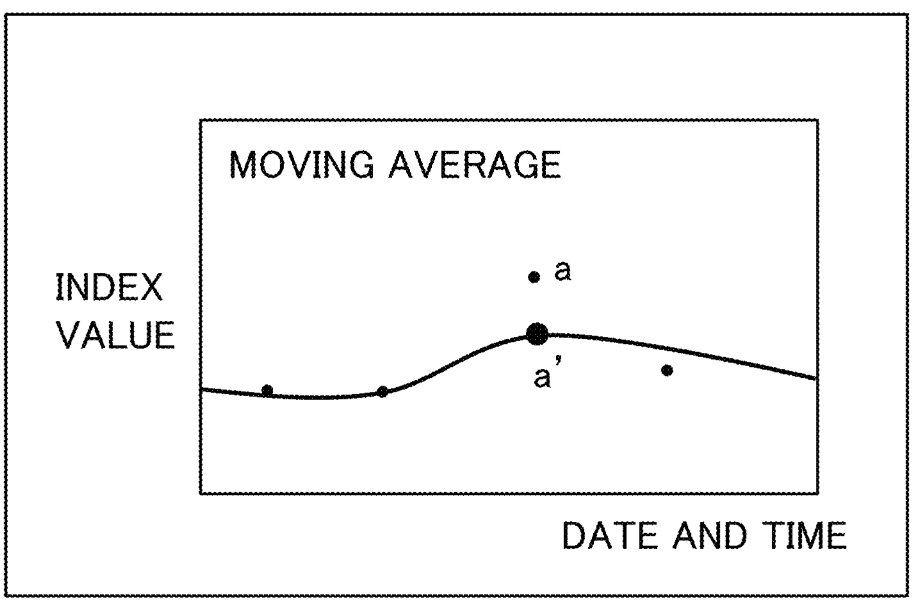
FIG. 9 is a diagram illustrating a statistical process (moving average) of outliers according to the first example embodiment.

Processing of excluding an outlier or bringing an outlier close to another value will be described. FIG. 9 is a diagram illustrating a statistical process (moving average) of an outlier according to the first example embodiment. In the example of FIG. 9, the index value of the point a is a value larger than other index values, and is an outlier. The deterioration index calculation unit 206 performs moving average processing of obtaining an average value for a certain section in the time series information while shifting the section, and smooths an outlier. As a result, as illustrated in FIG. 9, the index value of the point a is changed to the index value of the point a'.

Figure 10:
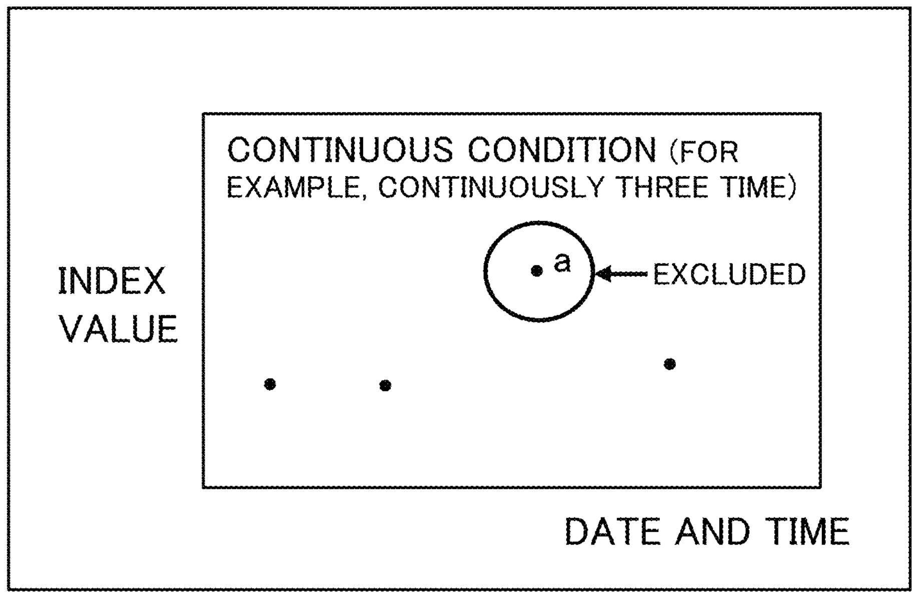
FIG. 10 is a diagram illustrating a statistical process (continuous condition) of outliers according to the first example embodiment.

FIG. 10 is a diagram illustrating a statistical process (continuous condition) of an outlier according to the first example embodiment. In the example of FIG. 10, as in the example of FIG. 9, the index value of the point a is a value larger than other index values, and is an outlier. The deterioration index calculation unit 206 sets a continuous condition in the time series information. For example, the deterioration index calculation unit 206 sets a condition that a value is within a predetermined threshold value continuously three times as the continuous condition. In the example of FIG. 11, the index value of the point a does not satisfy the condition that the index value of the point a is a value within the predetermined threshold value continuously three times, and thus the index value of the point a is excluded. In the example of FIG. 10, the deterioration index calculation unit 206 excludes the index value of the point a, but is not limited thereto. For example, the index value of the point a may be replaced with an average value of index values before and after the point a. The deterioration index calculation unit 206 is not limited thereto, and other outlier processing methods may be used.

The repair time prediction unit 208 predicts the repair time of the deterioration based on the time series information related to the deterioration index calculated by the deterioration index calculation unit 206 and the ground surface displacement information stored in the ground surface displacement information storage unit 204 (step S105). For example, the repair time prediction unit 208 predicts the repair time of a crack at a certain point based on the time series information about the crack width and the crack rate and the ground surface displacement information.

For example, the repair time prediction unit 208 predicts future date and time when at least one of the crack width and the crack rate exceeds a predetermined threshold value based on time series information about the crack width and the crack rate. In this case, the repair time prediction unit 208 may acquire a rate of change calculated by the deterioration index calculation unit 206 in at least one of the crack rate and the crack rate, and predict future date and time when the index value exceeds a predetermined threshold value based on the rate of change. For example, the repair time prediction unit 208 may predict future date and time when the index value exceeds a predetermined threshold value when it is assumed that the rate of change continues. The repair time prediction unit 208 may use a known prediction method related to deterioration instead of the rate of change.

In this case, the repair time prediction unit 208 may predict the repair time of the crack based on future date and time when at least one of the crack width and the crack rate exceeds a predetermined threshold value in consideration of the ground surface displacement information.

For example, in order to consider the ground surface displacement information, a table for classifying the ground surface displacement into a plurality of classifications according to the displacement value of the ground is stored in advance in a storage unit (not illustrated). FIG. 11 is a diagram illustrating an example of a weighting table of ground surface displacement information according to the first example embodiment. The weight is a value for reflecting the influence of the displacement of the ground surface obtained from the ground surface displacement information on the crack width and the crack rate. In the example of the weighting table of the ground surface displacement information in FIG. 11, the values of the displacement of the ground surface are distinguished in three levels, but the present disclosure is not limited thereto. The values of the displacement of the ground surface may be distinguished in two levels or may be distinguished in more than three levels. In the example of FIG. 11, the ground surface displacement is classified into three levels of L (low), M (medium), and H (high) according to the displacement value of the ground surface, and a weight is set for each classification. For example, the weight is 1.0 in the case of L (low), the weight is 1.2 in the case of M (medium), and the weight is 1.5 in the case of H (high). The weight is not limited to these values, and may be changed.

The repair time prediction unit 208 refers to the weighting table of the ground surface displacement information and determines the classification according to the displacement value of the ground surface at the point where the repair time is predicted. Next, by multiplying the time series information about the crack width and the crack rate by the weight of the determined classification, the repair time prediction unit 208 can predict future date and time when the crack width and the crack rate exceed predetermined threshold values in consideration of the ground surface displacement information. By using the ground surface displacement information in this manner, the repair time prediction unit 208 can more accurately predict the repair time, for example, even when the index values of the crack width and the crack rate are not bad.

In the above description, the case of considering the ground surface displacement information is described, but the present disclosure is not limited thereto. The repair time prediction unit 208 may predict the repair time of the deterioration of the road surface without using the ground surface displacement information.

The display processing unit 210 performs a display process of displaying the deterioration index value calculated by the deterioration index calculation unit 206 over the road surface on the map displayed on the display device 30 in a superimposed manner (step S106). For example, the deterioration index calculation unit 206 performs display process on the crack width and the crack rate calculated by the deterioration index calculation unit 206. The display processing unit 210 displays an image or the like instructed by a user such as a staff member of a road surface management company. An example of the display process in step S106 will be described later.

(Specific Deterioration Index Calculation Process)

Figure 12:
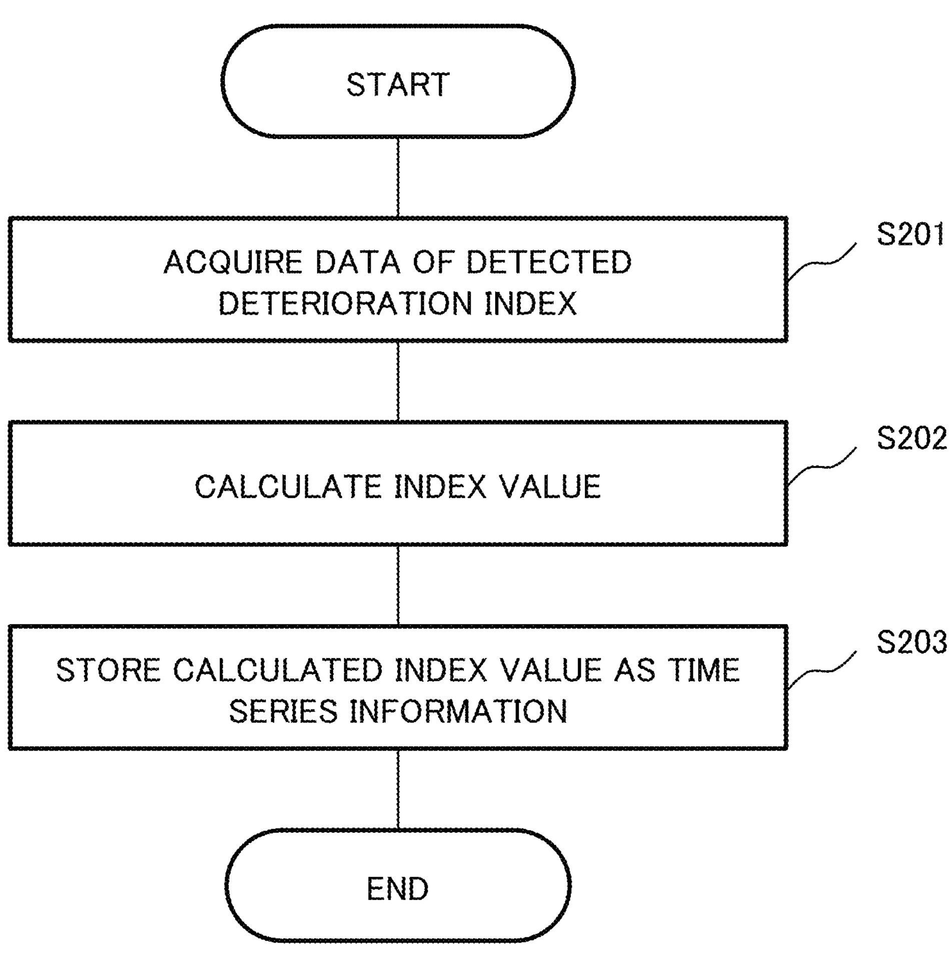
FIG. 12 is a flowchart illustrating an example of a deterioration index calculation process according to the first example embodiment.

FIG. 12 is a flowchart illustrating an example of a specific deterioration index calculation process according to the first example embodiment. The deterioration index calculation process is a process of calculating an index value of the road surface deterioration for the road surface deterioration detected by the deterioration detection unit 205. The deterioration calculation process illustrated in FIG. 12 corresponds to an operation example in step S103 in the deterioration index process illustrated in FIG. 8.

The deterioration index calculation unit 206 acquires data related to the deterioration index of the road surface detected by the deterioration detection unit 205 (step S201). For example, when the deterioration detection unit 205 analyzes the image and detects a crack, the deterioration index calculation unit 206 acquires the image. In the case of a road surface deterioration index other than the crack, for example, in the case of rutting, the deterioration index calculation unit 206 acquires an image and acceleration of a point where rutting has been detected.

The deterioration index calculation unit 206 calculates an index value of the road surface deterioration based on the data (the image and the acceleration) in which the road surface deterioration is detected (step S202). For example, when the deterioration detection unit 205 detects a crack, the deterioration index calculation unit 206 calculates the width of the crack and the ratio of the area of the crack to the road surface in the image from the image in which the crack is detected. In this case, the deterioration index calculation unit 206 may calculate the width of the crack and the area of the crack based on the pixels of the width of the crack in the image. The deterioration index calculation unit 206 may calculate information converted into a crack rate (deterioration degree) not only in units of images but also in units of certain sections.

For an index of another road surface deterioration, for example, in the case of the IRI, the deterioration index calculation unit 206 calculates the value of the IRI from the value of acceleration by a known method. Further, in the case of a pot hole, the deterioration index calculation unit 206 may calculate the size of the pot hole, for example, the area of the pot hole, the diameter of the pot hole, or the like from the pixels of the image based on the image in which the pot hole is detected.

The deterioration index calculation unit 206 stores the calculated index value in the time series information storage unit 209 in time series to obtain time series information (step S203). For example, every time a crack width and a crack rate are calculated, the deterioration index calculation unit 206 stores index value calculated in time series in the time series information storage unit 209. As a result, the deterioration index calculation unit 206 calculates time series information about the crack width and the crack rate. The time series information about the crack width and the crack rate is, for example, time series information in which the deterioration indexes are the "crack rate" and the "crack width" in the time series information in FIG. 6 described above.

(Display Process)

Figure 13:
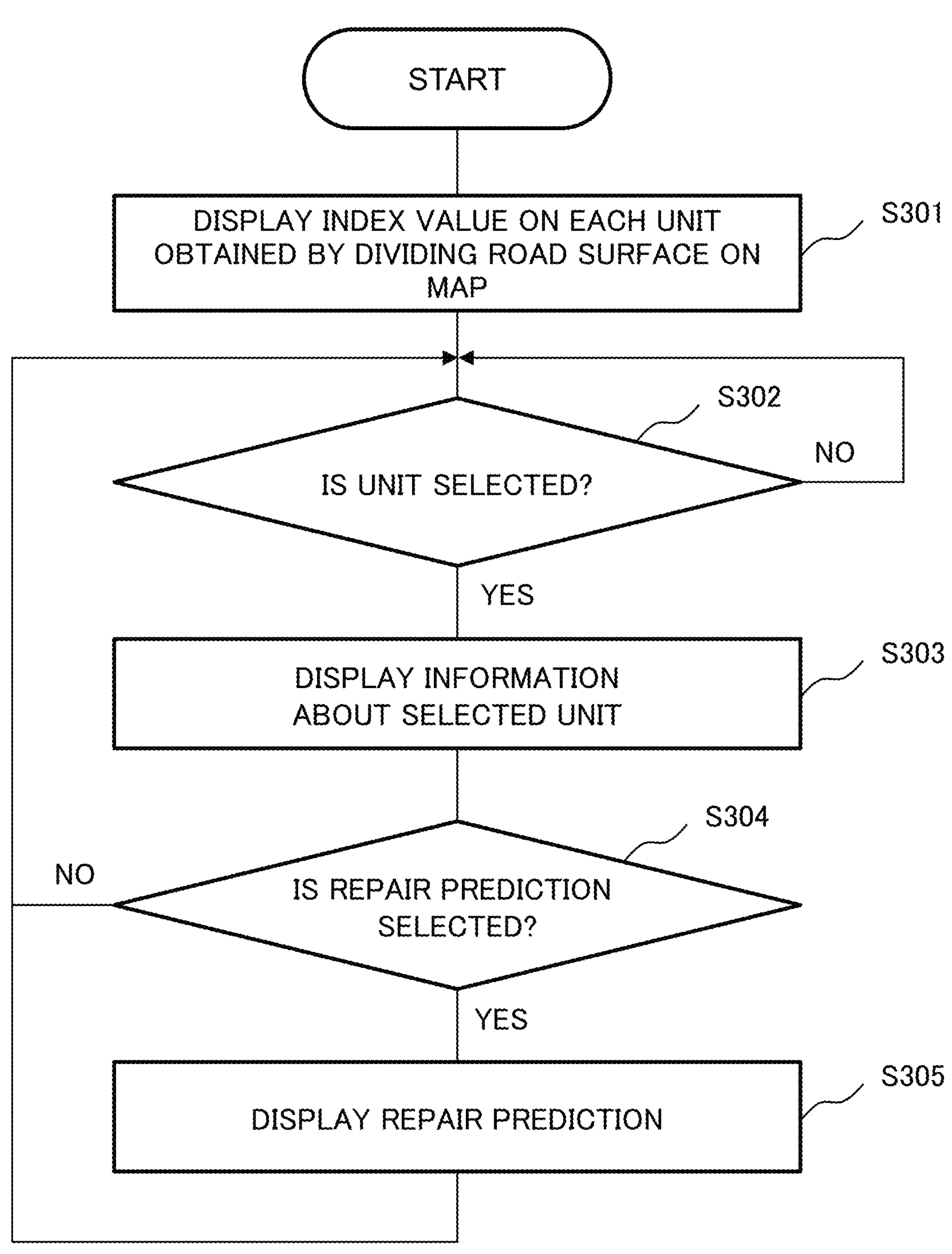
FIG. 13 is a flowchart illustrating an example of a display process according to the first example embodiment.

FIG. 13 is a flowchart illustrating an example of a display process according to the first example embodiment. The display process is a process of displaying the deterioration index value of the road surface calculated by the deterioration index calculation unit 206 over the road surface on the map displayed on the display device 30 in a superimposed manner. The display process illustrated in FIG. 13 corresponds to an operation example in step S106 in the deterioration index process illustrated in FIG. 8.

The display processing unit 210 displays the deterioration index value calculated by the deterioration index calculation unit 206 on each of the units obtained by dividing the road surface on the map displayed on the display device 30 (step S301). For example, the display processing unit 210 may represent the crack width and the crack rate in a display mode as illustrated in FIG. 7 described above. A case where the crack width and the crack rate are displayed in different display modes as illustrated in FIG. 7 will be described.

Figure 14:
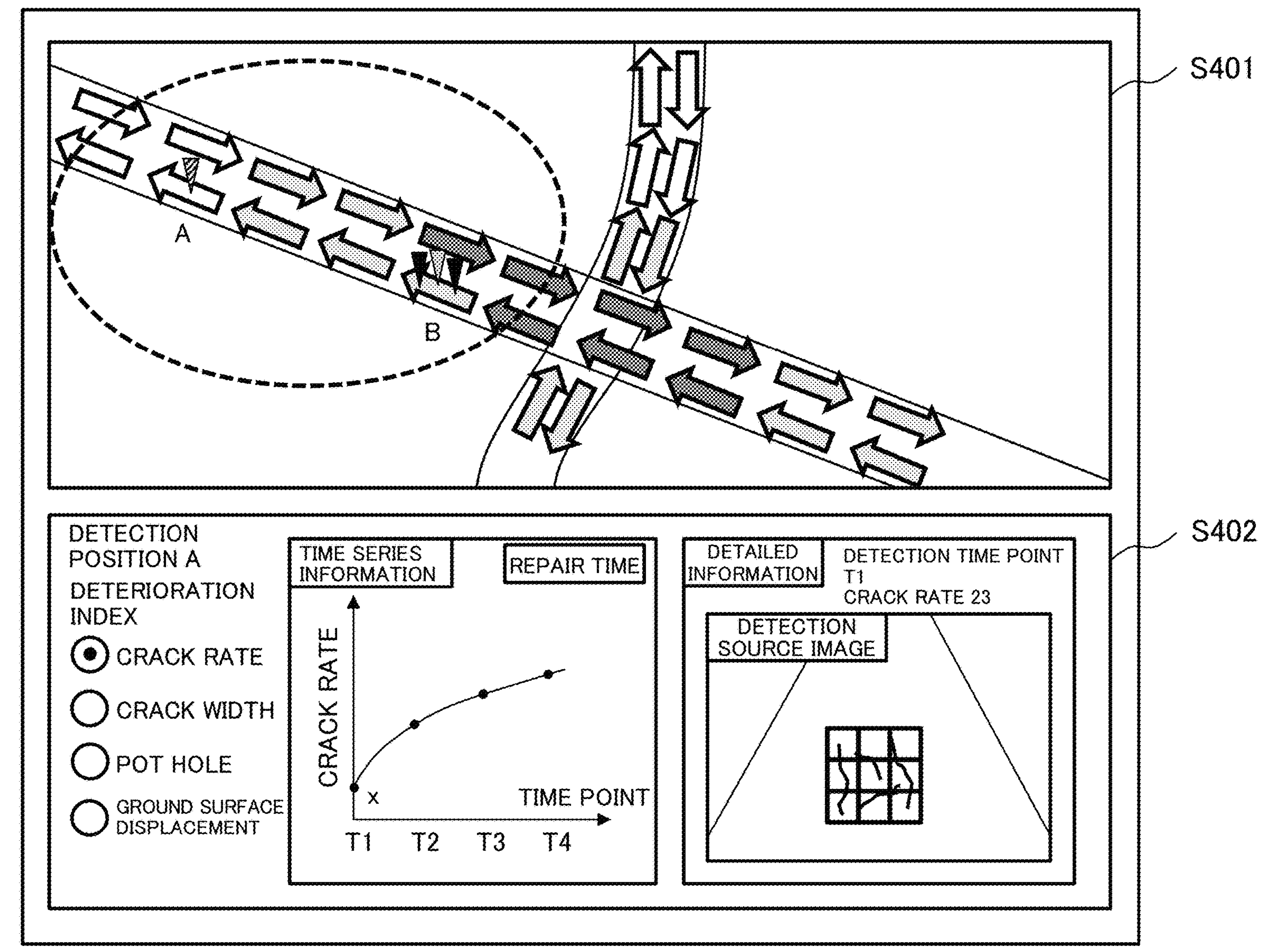
FIG. 14 is a diagram illustrating a display example by a display process according to the first example embodiment.

FIG. 14 is a diagram illustrating a display example in step S301. In the display example of FIG. 14, the display screen includes a map screen 401 and an information screen 402. In the map screen 401 of FIG. 14, each lane is divided by a unit having a predetermined length based on the unit information stored in the unit information storage unit 207 on the road having one lane on each side. In this case, each unit is represented by an arrow. The size of the arrow may be changed according to the area of each unit, or the direction of the arrow may be determined according to the traveling direction of the road. In the map screen 401 of FIG. 14, the directions of the arrows are different in accordance with the downward direction and the upward direction. The shape of the unit may be any shape as described above, and the size and shape of the arrow are appropriately determined according to the shape of the unit. The display processing unit 210 displays the crack rate in shading of an arrow for each unit. In the display example of FIG. 14, the crack rate is represented by 3 levels of shading, and the thicker the shading, the higher the crack rate. The crack rate for each unit may be an average value or a maximum value of crack rates at a plurality of places calculated in the unit, or may be a value calculated by another statistical process.

In the display example of FIG. 14, the display processing unit 210 displays the crack width with shading of an inverted triangle that is a predetermined symbol. For example, the crack width is classified into three levels of less than 5 mm, 5 to less than 10 mm, and equal to or more than 10 mm, and is displayed in such a way as to indicate that the crack width is thicker as the density is darker. In order to represent the crack width, the display processing unit 210 may display a predetermined symbol of an inverted triangle at each position where the crack is detected. When displaying the crack rate for each unit having a predetermined area, the display processing unit 210 may display the crack width for each unit having an area smaller than the predetermined area. For example, the display processing unit may display the crack width for each subunit obtained by further subdividing the unit. In this case, the display processing unit 210 displays a predetermined symbol of an inverted triangle representing the crack width for each subunit. The inverted triangle displayed for each subunit may represent the maximum crack width detected in the subunit, and may represent the average value of the crack widths detected in the subunit. When the crack width is displayed for each subunit, subunit information is stored in advance in the unit information storage unit 207. The unit is also referred to as a first unit, and the subunit is also referred to as a second unit.

In the display example of FIG. 14, the shading of the unit A indicates that the crack rate in the unit A is low, and the crack width is a narrow crack having a width of less than 5 mm according to the above classification. That is, it can be seen that the unit A has a small degree of deterioration related to a crack. The shading of the unit B indicates that the crack rate in the unit B is high, and the crack width is also a crack having a width of equal to or more than 10 mm according to the classification described above. That is, it can be seen that the unit B has a large degree of deterioration related to a crack.

Subsequently, the display processing unit 210 receives selection for a unit represented by the map screen 401 (step S302). When a unit (arrow) on the map screen 401 is selected by the user (step S302, YES), the display processing unit 210 displays information about the selected unit (step S303). For example, when the user clicks the unit A on the map screen 401, the display processing unit 210 displays information related to the unit A as illustrated in the information screen 402 of FIG. 14. At this time, the display processing unit 210 displays information about the deterioration index selected for the unit A.

The display example of FIG. 14 is an example in which the "crack rate", the "crack width", the "pot hole", or the "ground surface displacement" can be selected as the deterioration index by radio buttons. The display processing unit 210 displays a graph of time series information about the selected deterioration index. In FIG. 14, the "crack rate" is selected as the deterioration index, and a graph of time series information about the crack rate that is the selected deterioration index is displayed on the information screen 402.

Further, when a point on the displayed graph of the time series information, for example, a point x on the graph of the time series information about the crack rate in FIG. 14 is selected (clicked), the display processing unit 210 displays an image (hereinafter, also referred to as a detection source image) in which a crack is detected at the time point T1 as detailed information together with the detection time and the value of the crack rate.

Figure 15:
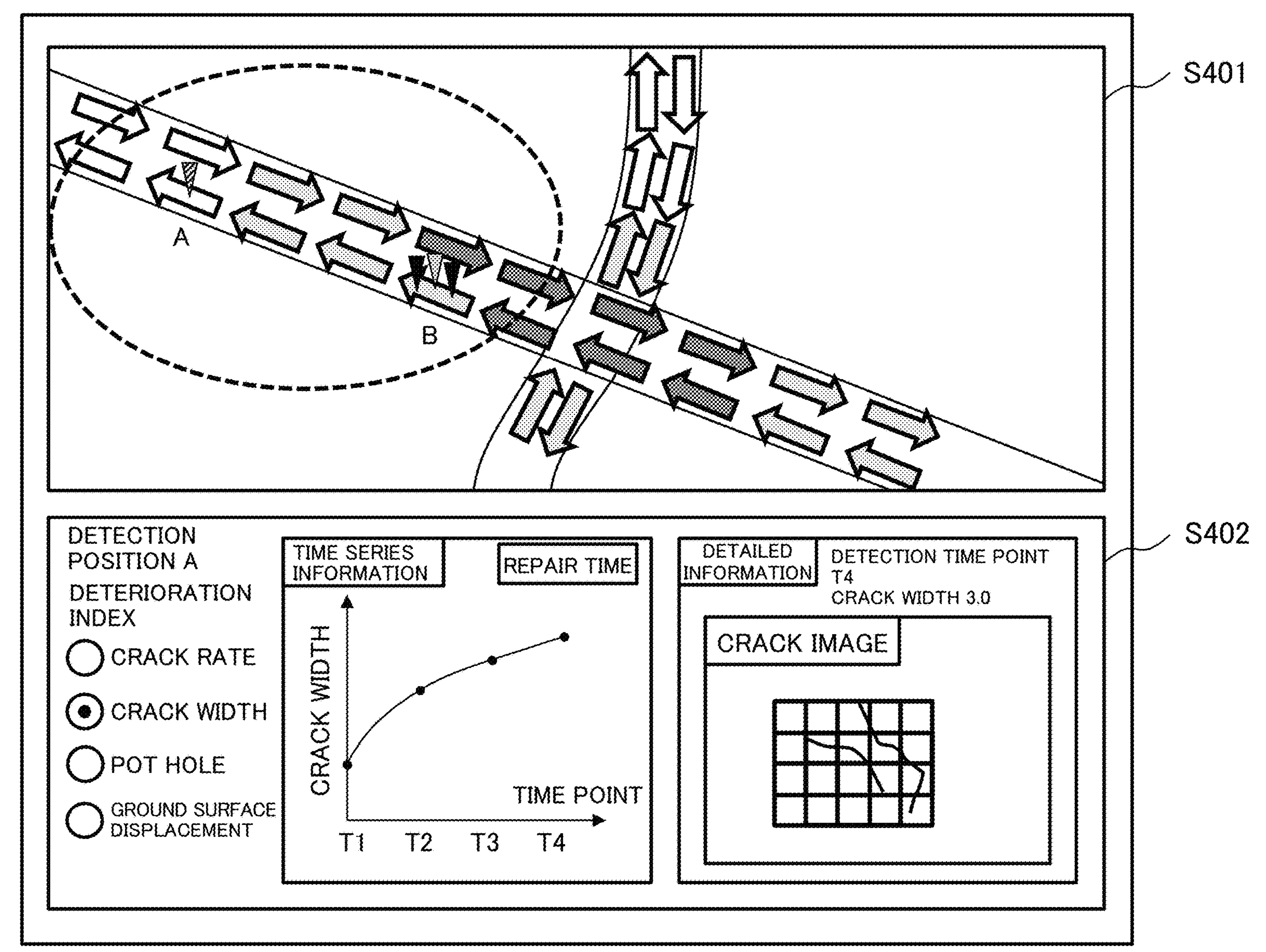
FIG. 15 is a diagram illustrating another display example in this case.

FIG. 15 is a diagram illustrating another display example in this case. FIG. 15 illustrates an example of the information screen 402 in a case where the user selects the "crack width" as the deterioration index. In this case, the display processing unit 210 displays a graph of the time series information about the crack width. In the display example of FIG. 15, since the point at a time point T4 is selected in the graph of the time series information about the crack width, the display processing unit 210 displays the detailed information at the time point.

Subsequently, the display processing unit 210 receives selection of necessity of repair time prediction for the unit represented by the map screen 401 (step S304). For example, when the user clicks the "repair time button" in the graph of the time series information on the information screen 402 (step S304, YES), the display processing unit 210 displays the prediction result of the repair time for the currently selected deterioration index (step S305).

Figure 16:
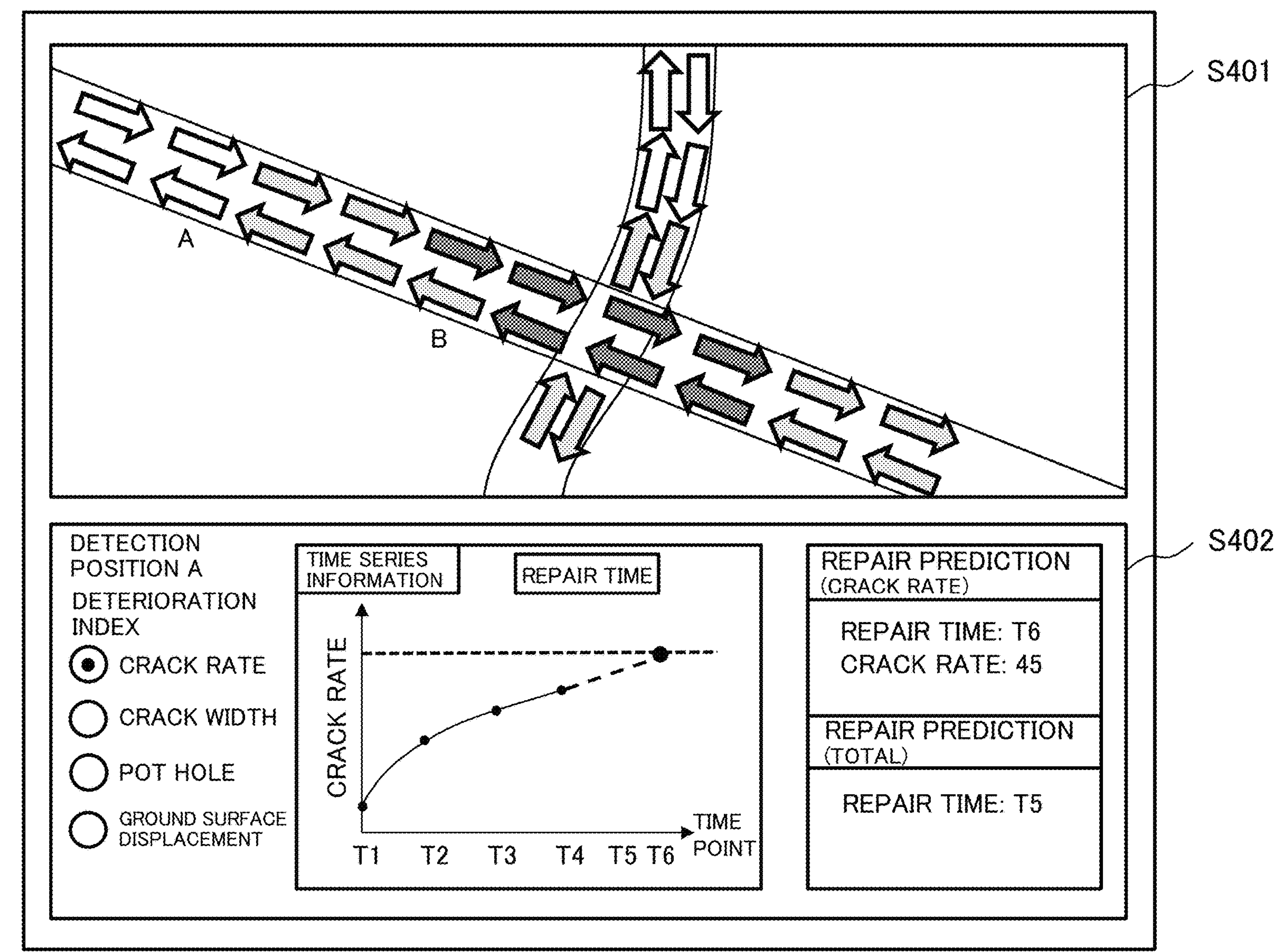
FIG. 16 is a view illustrating a display example of a repair time in step S305.

FIG. 16 is a diagram illustrating a display example of a repair time in step S305. When the "repair time button" is clicked in the graph of the time series information in FIG. 14, the display processing unit 210 changes the display of the information screen 402 from the display example in FIG. 14 to that in FIG. 16. Specifically, for example, the display processing unit 210 displays, in a graph of time series information about a currently selected crack rate, a threshold value that indicates a repair time in the crack rate by a dotted line. The threshold value as the repair time is predicted by the repair time prediction unit 208. Then, in the example of FIG. 16, the display processing unit 210 displays the repair time in a graph when only the crack rate is taken into consideration. In the display example of FIG. 16, the display processing unit 210 displays, next to the graph indicating the repair time, the information about the repair prediction in the case of considering only the crack rate and the repair time in consideration of the crack width and the ground surface displacement information predicted by the repair time prediction unit 208 in step S105 in FIG. 8 described above. In the display example of FIG. 16, the repair time considering only the crack rate is a time point T6 as shown in the field of the "repair time (crack rate)" in the table on the right side of the information screen 402. The repair time predicted using the ground surface displacement information and the one or more deterioration indexes is displayed in the field of the "repair time (composite)" in the table on the right side of the information screen 402. In the display example of FIG. 16, it is a time point T5 predicted by the repair time prediction unit 208 based on the ground surface displacement information, the crack rate, and the crack width.

The display processing unit 210 may display the repair time predicted by the repair time prediction unit 208 in advance, or may display the repair time predicted by the repair time prediction unit 208 after the "repair time button" is clicked. The repair time prediction unit 208 may predict the repair time based on the crack rate in each period of the time points T1 to T4. That is, the repair time prediction unit 208 may predict the repair time based on the rate of change in the deterioration index in the period from the time points T1 to T4, or may predict the repair time based on the rate of change in the deterioration index in the period from the time points T3 to T4, which is the latest period.

The display processing unit 210 may display the predicted time by a display method other than the display example described above. For example, the display processing unit 210 may simply display the time (time point) of the repair prediction instead of displaying the information indicating the repair time in the graph of the time series information.

When the prediction of the repair time is displayed, the display processing unit 210 returns to step S302 and repeats the process. That is, the display processing unit 210 receives selection for a unit represented by the map screen 401 (step S302).

Application Example of First Example Embodiment

In the above description, the road surface is a general road as an example. However, the road surface applied by the road surface management system 10 is not limited to a general road.

For example, the road surface management system 10 of the first example embodiment is applicable to an airport. In airports, there are road surfaces on a runway, a taxiway, an apron, and the like. In an airport, a standard of a road surface condition is stricter on all road surfaces than that of roads. Among them, the runway has a particularly strict standard for the state of the road surface, and the burden of the road surface management by the staff members is large. The road surface management system 10 is also applicable to these road surfaces.

Figure 17:
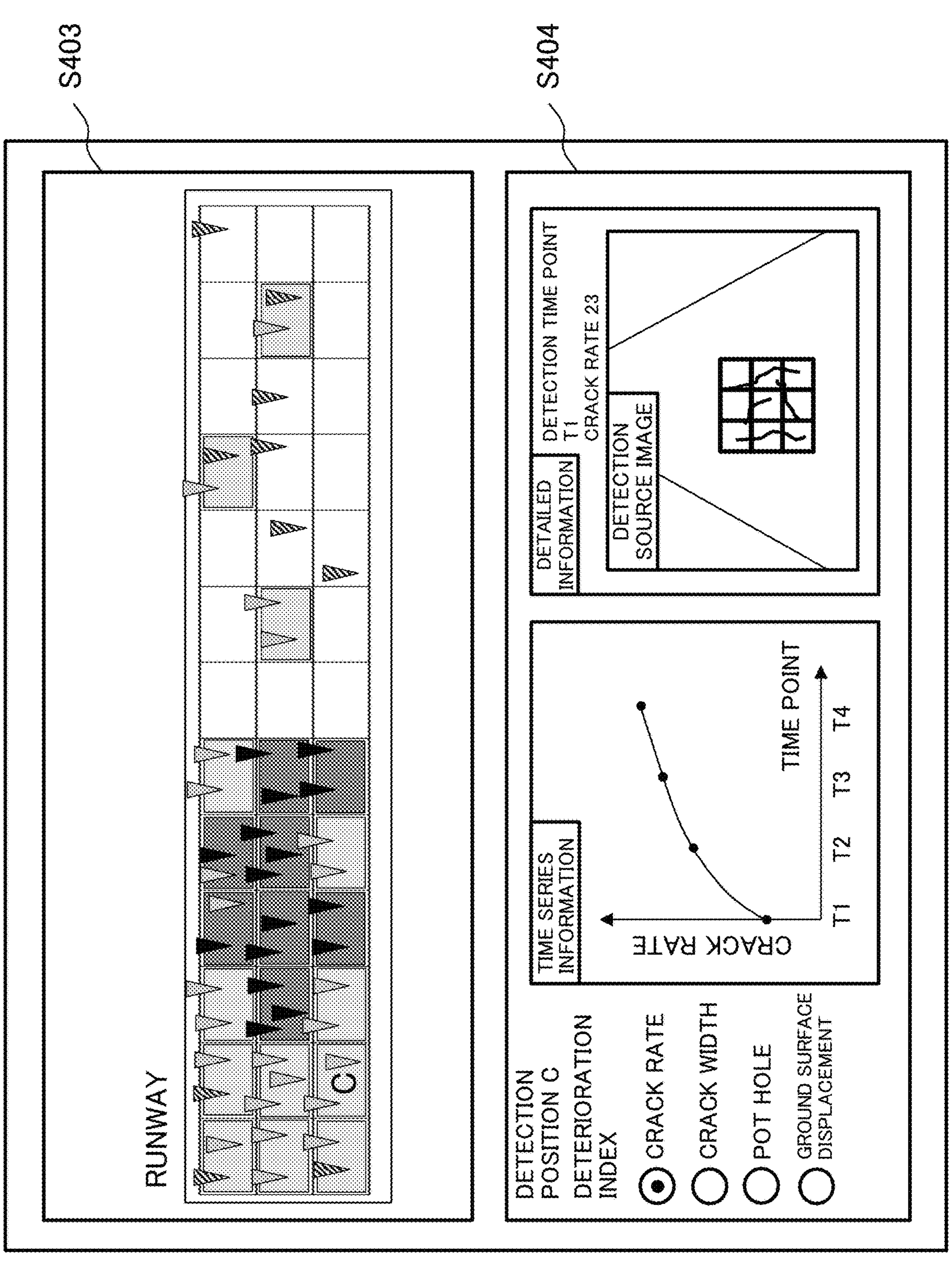
FIG. 17 is a view illustrating a display example of a runway according to the second example embodiment.

Unlike the road, the runway has a wide and long straight line. FIG. 17 is a diagram illustrating a display example of a runway according to the second example embodiment. In FIG. 17, the road surface of the runway is divided into a plurality of units and displayed on a map screen 403. A unit size of 15×45 m allows 3 or 4 units to be set in the width direction on many airport runways. The size of the unit is not limited thereto, and may be appropriately set according to the situation of the runway. Although the unit shape is rectangular, the unit shape is not limited thereto, and may be any shape. Unit information is stored in advance in the unit information storage unit 207 in accordance with the size of the set unit.

As in the case of the road, the display processing unit 210 may display the crack rate for each unit and display the crack width for each subunit. In the example of FIG. 17, the display processing unit 210 displays the crack rate for each unit and displays the maximum value of the crack width for each subunit.

Since the standard of the deterioration index is generally stricter on the road surface of the airport than on the road surface of the road, the classification of the deterioration index such as the crack width and the crack rate and the threshold value as the repair time may be made stricter than in the case of the road. In the display example of FIG. 17, the crack rate and the crack width have lower classification threshold values than those in the case of the road. For example, when the classification of the crack width is represented in three levels as in the case of the road, the crack width is divided into three levels of, for example, less than 3 mm, 3 to less than 6 mm, and equal to or more than 6 mm. The crack rate is also classified in the same manner as the crack width, although a specific numerical value is not mentioned. As in the case of the road, the crack width may be classified into two levels or more than three levels. The same applies to an index of another deterioration.

In FIG. 17, the display processing unit 210 displays the crack width with shading of a classification related to the length of the width by a predetermined symbol such as an inverted triangle. As in the case of the road, the display processing unit 210 performs display in such a way that the larger the crack width, the darker the shading.

In the display example of FIG. 17, the display processing unit 210 displays information on a map screen 401 similar to that on the map screen 404 according to the first example embodiment. However, the map screen displayed by the display processing unit 210 when applied to an airport is not limited thereto. In airports, cracks are usually repaired at the level of crack before becoming a pot hole. Therefore, the display processing unit 210 may display only the crack rate, the crack width, and the ground surface displacement information.

According to the first example embodiment, it is possible to reduce a burden of management regarding deterioration of a road surface. This is because the deterioration detection unit 205 detects a crack of the road surface based on the image of the road surface acquired from the vehicle 40, the deterioration index calculation unit 206 calculates a crack width and a crack rate of the detected crack based on the image, and the display processing unit 210 displays the calculated crack width and crack rate over the road surface on the map in a superimposed manner. This is because the deterioration detection unit 205 detects road surface deterioration other than a crack based on the image and the acceleration of the vehicle 40 acquired from the vehicle 40, the deterioration index calculation unit 206 calculates an index value indicating the detected state of the another road surface deterioration, and the display processing unit 210 displays the another road surface deterioration on the map in a display mode according to the index value. As a result, the staff member can grasp the deterioration indexes of different road surfaces at a time only by checking the map displayed on the display device, and can comprehensively know the deterioration state of the road surface.

Second Example Embodiment

The second example embodiment will be described.

Figure 18:
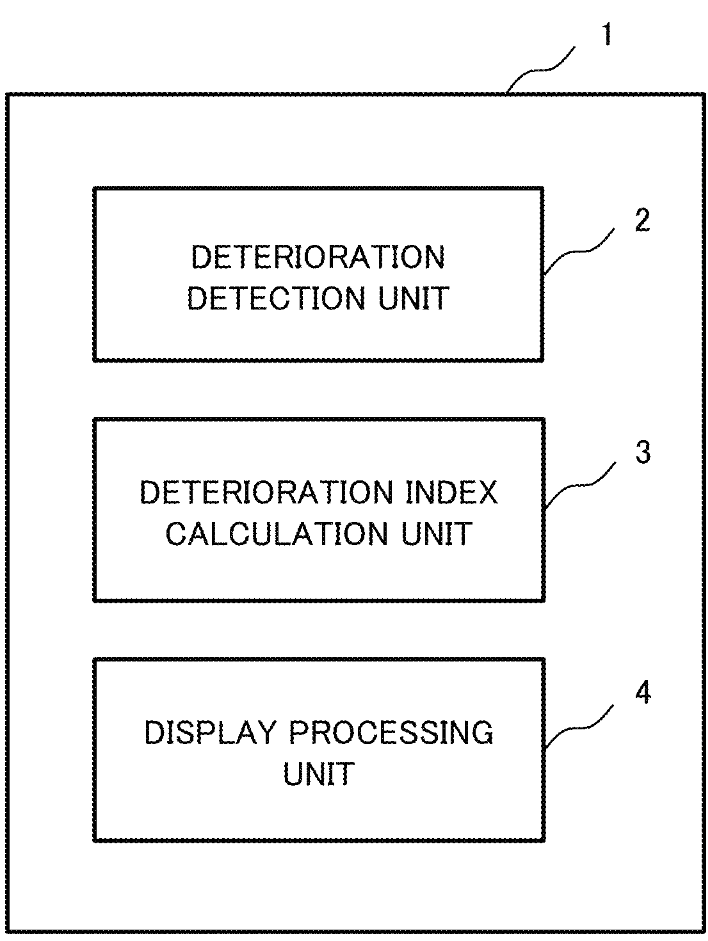
FIG. 18 is a block diagram illustrating a configuration of a road surface management device 1 according to the second example embodiment.

FIG. 18 is a block diagram illustrating a configuration of a road surface management device 1 according to the second example embodiment. A road surface management device 1 includes a deterioration detection unit 2, a deterioration index calculation unit 3, and a display processing unit 4. The deterioration detection unit 2, the deterioration index calculation unit 3, and the display processing unit 4 are an example embodiment of a deterioration detection unit, a deterioration index calculation unit, and a display processing unit of the present disclosure, respectively. The deterioration detection unit 2, the deterioration index calculation unit 3, and the display processing unit 4 correspond to the deterioration detection unit 205, the deterioration index calculation unit 206, and the display processing unit 210 of the first example embodiment, respectively.

The deterioration detection unit 2 detects a crack in a road surface based on an image of the road surface acquired from a vehicle. The deterioration index calculation unit 3 calculates, of the detected crack, a crack width and a crack rate based on the image. The display processing unit 4 display the calculated crack width and crack rate over the road surface on a map in a superimposed manner.

According to the second example embodiment, it is possible to reduce a burden of management regarding deterioration of a road surface. This is because the deterioration detection unit 2 of the road surface management device 1 detects a crack of the road surface based on the image of the road surface acquired from the vehicle, the deterioration index calculation unit 3 calculates a crack width and a crack rate of the detected crack based on the image, and the display processing unit 4 displays the calculated crack width and crack rate over the road surface on the map in a superimposed manner.

(Hardware Configuration)

In each of the above-described example embodiments, each component of each device (road surface management device 1, 20) indicates a block of a functional unit. Part or all of each component of each device may be achieved by an any combination of a computer 500 and the program.

Figure 19:
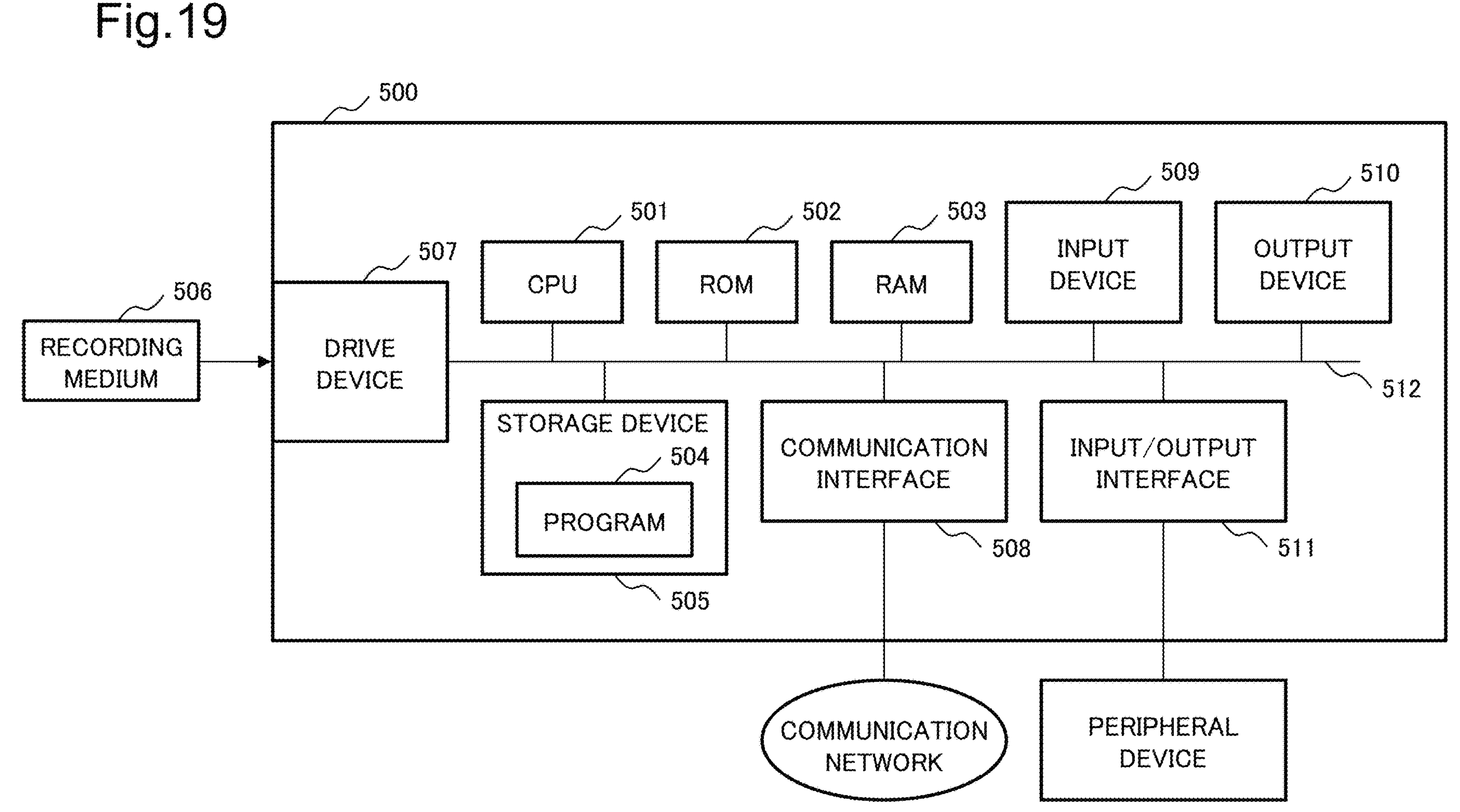
FIG. 19 is a block diagram illustrating an example of a hardware configuration of a computer 500.

FIG. 19 is a block diagram illustrating an example of a hardware configuration of the computer 500. Referring to FIG. 19, the computer 500 includes, for example, a central processing unit (CPU) 501, a read only memory (ROM) 502, a random access memory (RAM) 503, a program 504, a storage device 505, a drive device 507, a communication interface 508, an input device 509, an output device 510, an input/output interface 511, and a bus 512.

The program 504 includes an instruction for achieving each function of each device. The program 504 is stored in advance in the ROM 502, the RAM 503, and the storage device 505. The CPU 501 achieves each function of each device by executing instructions included in the program 504. For example, the CPU 501 of the road surface management device 20 executes a command included in the program 504 to implement the functions of the sensor information acquisition unit 201, the ground surface displacement information acquisition unit 203, the deterioration detection unit 205, the deterioration index calculation unit 206, the repair time prediction unit 208, and the display processing unit 210. For example, the RAM 503 of the road surface management device 20 may store data of the sensor information storage unit 202, the ground surface displacement information storage unit 204, the unit information storage unit 207, and the time series information storage unit 209.

The drive device 507 reads and writes the recording medium 506. The communication interface 508 provides an interface with a communication network. The input device 509 is, for example, a mouse, a keyboard, or the like, and receives an input of information from an operator or the like. The output device 510 is, for example, a display to output (display) information to an operator or the like. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 19 is an example, and other components may be added or some components may not be included.

There are various modifications of the implementation method of each device. For example, each device may be achieved by an any combination of a computer and a program different for each component. A plurality of components included in each device may be achieved by any combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Part or all of each component of each device may be achieved by a combination of the above-described circuit or the like and the program.

In a case where part or all of each component of each device is achieved by a plurality of computers, circuits, and the like, the plurality of computers, circuits, and the like may be disposed in a centralized manner or in a distributed manner.

Although the present disclosure is described with reference to the example embodiments, the present disclosure is not limited to the example embodiments. Various modifications that can be understood by those of ordinary skill in the art can be made to the configuration and details of the present disclosure within the scope of the present disclosure. The configurations according to the example embodiments can be combined with each other without departing from the scope of the present disclosure.

The present disclosure is not limited to the above-described example embodiments. That is, it will be understood by those of ordinary skill in the art that the present disclosure can have various aspects without departing from the spirit and scope of the present disclosure as defined by the claims.

The whole or part of the example embodiments disclosed above can be described as, but not limited to, the following supplementary notes.

SUPPLEMENTARY NOTE

Supplementary Note 1

A road surface management device including

- a deterioration detection means configured to detect, based on an image of a road surface acquired from a mobile body, a crack of the road surface,
- a deterioration index calculation means configured to calculate a crack width and a crack rate of the detected crack based on the image, and
- a display processing means configured to display the calculated crack width and the calculated crack rate over the road surface on a map in a superimposed manner.

Supplementary Note 2

The road surface management device according to Supplementary Note 1, wherein

- the display processing means displays at least one of time series information about the crack width and time series information about the crack rate, together with the map.

Supplementary Note 3

The road surface management device according to Supplementary Note 2, wherein

- the display processing means displays any one of the time series information about the crack width and the time series information about the crack rate, according to selection by a user.

Supplementary Note 4

The road surface management device according to any one of Supplementary Notes 1 to 3, wherein

- the deterioration index calculation means predicts deterioration of the crack of the road surface based on at least one of the time series information about the crack width and the time series information about the crack rate.

Supplementary Note 5

The road surface management device according to Supplementary Note 4, wherein

- the deterioration index calculation means calculates a rate of change in an index value of at least one of the crack width and the crack rate in a predetermined period, and predicts deterioration of the crack of the road surface based on the rate of change.

Supplementary Note 6

The road surface management device according to Supplementary Note 5, wherein

- the deterioration index calculation means calculates the rate of change in an index value of at least one of the crack width and the crack rate by excluding or correcting an outlier by a statistical process.

Supplementary Note 7

The road surface management device according to Supplementary Note 5 or 6, wherein

- the deterioration index calculation means calculates time series information about the rate of change in an index value of at least one of the crack width and the crack rate.

Supplementary Note 8

The road surface management device according to any one of Supplementary Notes 4 to 7, wherein

- the deterioration index calculation means predicts deterioration of the crack of the road surface based on at least one of the time series information about the crack width and the time series information about the crack rate, and on time series information about ground surface displacement information.

Supplementary Note 9

The road surface management device according to any one of Supplementary Notes 4 to 8, further including

- a repair time prediction means configured to predict a repair time of the crack of the road surface based on the deterioration of the crack of the road surface predicted by the deterioration index calculation means.

Supplementary Note 10

The road surface management device according to Supplementary Note 9, wherein

- the display processing means displays the repair time of the crack predicted by the repair time prediction means.

Supplementary Note 11

The road surface management device according to any one of Supplementary Notes 1 to 10, wherein the deterioration index calculation means calculates the crack rate for each of first units obtained by dividing the road surface, and the display processing means displays the crack rate for each of the first units.

Supplementary Note 12

The road surface management device according to Supplementary Note 11, wherein the deterioration index calculation means calculates the crack width of second units obtained by dividing the road surface by an area smaller than an area of each of the first units, and the display processing means displays the crack width for each of the second units together with the crack rate.

Supplementary Note 13

The road surface management device according to any one of Supplementary Notes 1 to 12, wherein the deterioration detection means detects another road surface deterioration other than the crack, the another road surface deterioration including at least one of rutting, a pot hole, an IRI, an MCI, flatness σ, and a BBI, based on at least one of the image and an acceleration of the mobile body acquired from the mobile body, the deterioration index calculation means calculates an index value indicating a state of the another road surface deterioration, and the display processing means displays the another road surface deterioration on the map in a display mode according to the index value.

Supplementary Note 14

The road surface management device according to Supplementary Note 13, wherein the display processing means displays time series information about the index value of the another road surface deterioration, together with the map.

Supplementary Note 15

The road surface management device according to Supplementary Note 14, wherein the display processing means displays, according to selection of a type of the another road surface deterioration by a user, time series information about the index value of the selected another road surface deterioration.

Supplementary Note 16

The road surface management device according to any one of Supplementary Notes 13 to 15, wherein the deterioration index calculation means predicts the index value of the another road surface deterioration based on time series information about the index value of the another road surface deterioration.

Supplementary Note 17

The road surface management device according to Supplementary Note 16, wherein the deterioration index calculation means calculates a rate of change in the index value of the another road surface deterioration in a predetermined period, and predicts the another road surface deterioration based on the rate of change.

Supplementary Note 18

The road surface management device according to Supplementary Note 17, wherein the deterioration index calculation means calculates the rate of change in the index value of the another road surface deterioration by excluding or correcting an outlier by a statistical process.

Supplementary Note 19

The road surface management device according to Supplementary Note 17 or 18, wherein the deterioration index calculation means calculates time series information about the rate of change in the index value of the another road surface deterioration.

Supplementary Note 20

The road surface management device according to any one of Supplementary Notes 16 to 19, wherein the deterioration index calculation means predicts the index value of the another road surface deterioration based on time series information about the index value of the another road surface deterioration and time series information about ground surface displacement information.

Supplementary Note 21

The road surface management device according to any one of Supplementary Notes 16 to 20, wherein the repair time prediction means predicts a repair time of the another road surface deterioration based on the index value of the another road surface deterioration predicted by the deterioration index calculation means.

Supplementary Note 22

The road surface management device according to Supplementary Note 21, wherein the display processing means displays a repair time of the another road surface deterioration predicted by the repair time prediction means.

Supplementary Note 23

The road surface management device according to any one of Supplementary Notes 13 to 22, wherein the deterioration index calculation means calculates the index value of the another road surface deterioration for each of the units obtained by dividing the road surface, and the display processing means displays the index value of the another road surface deterioration for each of the units.

Supplementary Note 24

A road surface management method including detecting, based on an image of a road surface acquired from a mobile body, a crack of the road surface, calculating a crack width and a crack rate of the detected crack based on the image, and displaying the calculated crack width and the calculated crack rate over the road surface on a map in a superimposed manner.

Supplementary Note 25

A recording medium that records a program for causing a computer to execute the processes of detecting, based on an image of a road surface acquired from a mobile body, a crack of the road surface, calculating a crack width and a crack rate of the detected crack based on the image, and displaying the calculated crack width and the calculated crack rate over the road surface on a map in a superimposed manner.

REFERENCE SIGNS LIST

1, 20 road surface management device
2, 205 deterioration detection unit
3, 206 deterioration index calculation unit
4, 210 display processing unit
10 road surface management system
30 display device
40 vehicle
50 ground surface measurement device
201 sensor information acquisition unit
202 sensor information storage unit
203 ground surface displacement information acquisition unit
204 ground surface displacement information storage unit
207 unit information storage unit
208 repair time prediction unit
209 time series information storage unit
500 computer
501 CPU
502 ROM
503 RAM
504 program
505 storage device
506 recording medium
507 drive device
508 communication interface
509 input device
510 output device
511 input/output interface
512 bus

What is claimed is:

1. An apparatus comprising:

a memory storing instructions, time series information about a crack width of a crack of a road surface, and time series information about a crack rate of the crack of the road surface; and at least one processor configured to execute the instructions to:

detect, based on an image of the road surface acquired from a sensor or sensors mounted on a mobile body, the crack of the road surface;

calculate the crack width and the crack rate of the detected crack based on at least one of the image and an acceleration of the mobile body acquired from the sensor or sensors mounted on the mobile body;

store the calculated crack width and the calculated crack rate in the memory in time series;

exclude or correct an outlier in at least one of the time series information about the crack width and the time series information about the crack rate, which are stored in the memory, by a statistical process;

calculate a rate of change in an index value of at least one of the crack width and the crack rate in a predetermined period, based on the time series information about the crack width or the time series information about the crack rate that has been subjected to the statistical process;

predict deterioration of the crack of the road surface based on the rate of change; and display the calculated crack width and the calculated crack rate over the road surface on a map in a superimposed manner, thereby reducing a burden of management regarding deterioration of the road surface.

2. The apparatus according to claim 1, wherein the at least one processor is further configured to execute the instructions to:

display at least one of time series information about the crack width and time series information about the crack rate, together with the map.

3. The apparatus according to claim 2, wherein the at least one processor is further configured to execute the instructions to:

display any one of the time series information about the crack width and the time series information about the crack rate, according to selection by a user.

4. The apparatus according to claim 1, wherein the at least one processor is further configured to execute the instructions to:

calculate time series information about the rate of change in an index value of at least one of the crack width and the crack rate.

5. The apparatus according to claim 1, wherein the at least one processor is further configured to execute the instructions to:

predict the deterioration of the crack of the road surface based on at least one of the time series information about the crack width and the time series information about the crack rate, and on time series information about ground surface displacement information.

6. The apparatus according to claim 1, further comprising:

the at least one processor is further configured to execute the instructions to:

predict a repair time of the crack of the road surface based on the deterioration of the crack of the road surface predicted.

7. The apparatus according to claim 6, wherein the at least one processor is further configured to execute the instructions to:

display the repair time of the crack of the road surface.

8. The apparatus according to claim 1, wherein the at least one processor is further configured to execute the instructions to:

calculate a crack rate of each of first units obtained by dividing the road surface, and display the crack rate for each of the first units.

9. The apparatus according to claim 8, wherein the at least one processor is further configured to execute the instructions to:

calculate a crack width of second units obtained by dividing the road surface by an area smaller than an area of each of the first units, and display the crack width for each of the second units together with the crack rate of each of the first units.

10. The apparatus according to claim 1, wherein the at least one processor is further configured to execute the instructions to:

detect another road surface deterioration other than the crack, the another road surface deterioration including at least one of rutting, a pot hole, an International Roughness Index (IRI), a Maintenance Control Index (MCI), flatness σ, and a Boeing Bump Index (BBI), based on at least one of the image and an acceleration of the mobile body acquired from the mobile body, calculate an index value indicating a state of the another road surface deterioration, and display the another road surface deterioration on the map in a display mode according to the index value.

11. The apparatus according to claim 10, wherein the at least one processor is further configured to execute the instructions to:

display time series information about the index value of the another road surface deterioration, together with the map.

12. The apparatus according to claim 11, wherein the at least one processor is further configured to execute the instructions to:

display, according to selection of a type of the another road surface deterioration by a user, time series information about an index value of the selected another road surface deterioration.

13. The apparatus according to claim 10, wherein the at least one processor is further configured to execute the instructions to:

predict the index value of the another road surface deterioration based on time series information about the index value of the another road surface deterioration.

14. The apparatus according to claim 13, wherein the at least one processor is further configured to execute the instructions to:

calculate a rate of change in the index value of the another road surface deterioration in a predetermined period, and predict the another road surface deterioration based on the rate of change.

15. The apparatus according to claim 14, wherein the at least one processor is further configured to execute the instructions to:

calculate the rate of change in the index value of the another road surface deterioration by excluding or correcting an outlier by a statistical process.

16. A method comprising:

detecting, based on an image of a road surface acquired from a sensor or sensors mounted on a mobile body, a crack of the road surface;

calculating a crack width and a crack rate of the detected crack based on at least one of the image and an acceleration of the mobile body acquired from the sensor or sensors mounted on the mobile body;

storing the calculated crack width and the calculated crack rate in a memory in time series;

exclude or correct an outlier in at least one of time series information about the crack width and time series information about the crack rate, which are stored in the memory, by a statistical process;

calculating a rate of change in an index value of at least one of the crack width and the crack rate in a predetermined period, based on the time series information about the crack width or the time series information about the crack rate that has been subjected to the statistical process;

predicting deterioration of the crack of the road surface based on the rate of change; and displaying the calculated crack width and the calculated crack rate over the road surface on a map in a superimposed manner, thereby reducing a burden of management regarding deterioration of the road surface.

17. A recording medium non-transitorily storing a program for causing a computer to execute the processes of:

detecting, based on an image of a road surface acquired from a sensor or sensors mounted on a mobile body, a crack of the road surface;

calculating a crack width and a crack rate of the detected crack based on at least one of the image and an acceleration of the mobile body acquired from the sensor or sensors mounted on the mobile body;

storing the calculated crack width and the calculated crack rate in a memory in time series;

exclude or correct an outlier in at least one of time series information about the crack width and time series information about the crack rate, which are stored in the memory, by a statistical process;

calculating a rate of change in an index value of at least one of the crack width and the crack rate in a predetermined period, based on the time series information about the crack width or the time series information about the crack rate that has been subjected to the statistical process;

predicting deterioration of the crack of the road surface based on the rate of change; and displaying the calculated crack width and the calculated crack rate over the road surface on a map in a superimposed manner, thereby reducing a burden of management regarding deterioration of the road surface.

* * * * *